United States Patent
Snook et al.

(10) Patent No.: US 9,162,855 B1
(45) Date of Patent: Oct. 20, 2015

(54) WHEEL LIFTING DOLLY

(75) Inventors: Jonathan Snook, Southlake, TX (US);
Thomas G. Fulbright, Keller, TX (US)

(73) Assignee: Wheelfloat, Inc., Southlake, TX (US)

( * ) Notice: Subject to any disclaimer, the term of this patent is extended or adjusted under 35 U.S.C. 154(b) by 925 days.

(21) Appl. No.: 13/277,030

(22) Filed: Oct. 19, 2011

(51) Int. Cl.
*B66F 1/00* (2006.01)

(52) U.S. Cl.
CPC .................................... *B66F 1/00* (2013.01)

(58) Field of Classification Search
CPC ................ B66F 1/00; B66F 1/08; B66F 3/26
USPC ...................................... 254/93 R, 89 H, 2 B
See application file for complete search history.

(56) References Cited

U.S. PATENT DOCUMENTS

| | | |
|---|---|---|
| 2,326,684 A | 8/1943 | Ross |
| 2,364,918 A | 12/1944 | Roberson |
| 2,429,723 A | 10/1947 | Kelley |
| 2,543,298 A | 2/1951 | Owens |
| 2,570,587 A | 10/1951 | Noone |
| 2,725,997 A | 12/1955 | Shvetz |
| 3,080,066 A | 3/1963 | Berridge |
| 3,273,857 A | 9/1966 | Branick |
| 3,433,500 A | 3/1969 | Christensen |
| 3,976,212 A | 8/1976 | Sanchez |
| 3,987,915 A | 10/1976 | Conner |
| 4,042,139 A | 8/1977 | Pernsteiner et al. |
| 4,460,306 A | 7/1984 | Hawkins |
| 4,530,536 A | 7/1985 | Williams |
| 4,586,696 A | 5/1986 | Mugford |
| 4,597,711 A | 7/1986 | Liebermann |
| 4,724,930 A | 2/1988 | VanLierop |
| 4,801,152 A | 1/1989 | Elliott |
| 4,872,694 A | 10/1989 | Griesinger |
| 5,074,608 A | 12/1991 | Gabriel |
| 5,180,141 A | 1/1993 | Hunt |
| 5,314,288 A | 5/1994 | Schmidt |
| 5,348,438 A | 9/1994 | Roberts |
| 5,464,314 A | 11/1995 | Laaksonen |
| 5,484,134 A * | 1/1996 | Francis .......................... 254/2 B |
| 5,505,578 A * | 4/1996 | Fuller ............................ 414/427 |
| 5,562,389 A | 10/1996 | Mitchell |
| 5,581,866 A | 12/1996 | Barkus |

(Continued)

FOREIGN PATENT DOCUMENTS

| | | |
|---|---|---|
| CA | 02124968 A1 | 12/1995 |
| EP | 0544150 A2 | 6/1993 |

(Continued)

OTHER PUBLICATIONS

Web Page: norcoind.com/norco/whdoll.htm, "Wheel Dollies", Norco Industries, Jun. 9, 2004.

(Continued)

*Primary Examiner* — Lee D Wilson
(74) *Attorney, Agent, or Firm* — Jack D. Stone, Jr., Esq.; Scheef & Stone, L.L.P.

(57) ABSTRACT

A wheel lift system for efficiently lifting and positioning a wheel and tire onto a wheel hub includes a support structure configured having three legs, and a wheel mounted at the end of each leg. A base block is mounted on the support structure, and a gas actuator is mounted on the base block. A wheel carriage is mounted on the air actuator, the air actuator being configured for facilitating vertical lift of the wheel carriage.

33 Claims, 21 Drawing Sheets

(56) References Cited

U.S. PATENT DOCUMENTS

| | | | |
|---|---|---|---|
| 5,664,898 | A | 9/1997 | Ferrari et al. |
| 5,709,520 | A | 1/1998 | Pish |
| 5,722,513 | A | 3/1998 | Rowan et al. |
| 5,855,359 | A | 1/1999 | Chipperfield |
| 5,886,258 | A | 3/1999 | Maioli et al. |
| 5,897,171 | A | 4/1999 | Seifert |
| 5,911,408 | A * | 6/1999 | Berends et al. ............... 254/2 B |
| 5,975,495 | A * | 11/1999 | Berends et al. ............... 254/2 B |
| 5,984,410 | A | 11/1999 | Brodersen |
| 6,074,118 | A | 6/2000 | Ferrari et al. |
| 6,095,745 | A | 8/2000 | Garnett |
| 6,106,214 | A | 8/2000 | Saffelle et al. |
| 6,131,293 | A | 10/2000 | Maioli et al. |
| 6,152,505 | A | 11/2000 | Coyne |
| 6,237,206 | B1 | 5/2001 | Bezemer et al. |
| 6,276,732 | B1 | 8/2001 | Hauss |
| 6,298,535 | B1 | 10/2001 | Lower |
| 6,527,321 | B1 | 3/2003 | Kuciauskas |
| 6,719,521 | B1 | 4/2004 | Van Boxtel |
| 6,929,442 | B2 | 8/2005 | Ferrari et al. |
| 7,207,764 | B1 | 4/2007 | Snook |
| 7,347,409 | B2 * | 3/2008 | Goza ............................ 254/2 B |
| 7,611,126 | B2 * | 11/2009 | Vesa ........................... 254/93 H |
| 7,708,516 | B1 | 5/2010 | Snook |
| 7,980,804 | B2 | 7/2011 | Snook et al. |
| 8,567,761 | B2 * | 10/2013 | De Jong et al. ............. 254/89 R |
| 2005/0012287 | A1 | 1/2005 | Goldenberg |
| 2005/0023070 | A1 | 2/2005 | Smiley et al. |
| 2006/0208240 | A1 * | 9/2006 | Spittle et al. ................... 254/8 B |
| 2006/0231343 | A1 | 10/2006 | Vesa |

FOREIGN PATENT DOCUMENTS

| | | |
|---|---|---|
| FR | 02749838 A1 | 6/1996 |
| JP | 08318703 A | 12/1996 |
| JP | 09267607 A | 10/1997 |

OTHER PUBLICATIONS

Web Page: jackxchange.com/products/82302B.cfm; "Wheel Dollies"; Jack-x-change; Jun. 9, 2004.

Web Page: alltiresupply.com/Merchant2/merchant.mv?Screen=PROD&Store_Code=MD..; "Lincoln ¾ Ton Hydraulic Wheel Dolly"; All Tire Supply Co.; May 26, 2004.

Web Page: alltiresupply.com/Merchant2/merchant.mv...1AK810C1&Product_Code=ESC-70130&Category_Code=M_WD; "ESCO Truck Wheel Dolly"; All Tire Supply Co.; May 26, 2004.

Web Page: rotarylift.com; "Productivity Tools and Equipment: Battery Powered Mobile Wheel Lift"; Rotary, A Dover Company, Madison, Indiana.

Web Page: alltiresupply.com/Merchant2/merchant.mv?Screen=PROD&Store_Code=MD . . . ; AME-47050/Omega ¾ Ton Capacity Wheel Dolly; All Tire Supply Co., May 26, 2004.

Web Page: http://www.agequipment.co.uk/wheel_lift; "Craftsman Commercial Wheel Lift"; Automotive Garage Equipment; May 26, 2004.

* cited by examiner

WHEEL LIFTING DOLLY

TECHNICAL FIELD

The invention relates generally to wheel lift devices and, more specifically, to a wheel lift system for efficiently lifting and positioning a wheel and tire onto a wheel hub, as well as for transporting and lifting a wheel to and from tire changing and tire balancing apparatus.

BACKGROUND

Wheel lift devices have been in use for years. Conventional wheel lift devices are typically comprised of a hydraulic/pneumatic bottle jack lifting system that lifts the wheel in position with respect to a wheel hub. Another method of lifting wheels into a desired position with respect to a wheel hub is by manually positioning the wheel with blocks and related objects. Further methods can be found using winches, electric motors or a pneumatic cylinder that lifts a wheel into position. Conventional wheel lift devices for positioning wheels with respect to a hub are relatively heavy, cumbersome, and slow to operate and are not intended for transporting wheels to and from tire changing and balancing apparatus. Additionally, while these conventional wheel lift devices are suitable for accessing wheels of vehicles on "single-post" and "two-post" vehicle lifts (post lifts), they are not suitable for accessing wheels of vehicles on "low-rise" vehicle lifts (often referred to as pad lifts). Other conventional wheel lifts that are used at a tire changing apparatus or at tire balancing apparatus are fixed to the apparatus and are not mobile. Since they are attached to the apparatus, they are not suitable for lifting wheels at other apparatus or to and from a wheel hub of a vehicle.

While conventional devices may be suitable for the particular purpose to which they address, they are not as suitable for efficiently lifting, transporting and positioning a wheel at all the three fundamental operations of tire changing (1. on and off of vehicle; 2. tire changing table; and 3. tire balancer) while also interfacing with vehicles on low-rise lifts.

In these respects, the wheel lift system according to the present invention substantially departs from the conventional concepts and designs of the prior art, and in so doing provides an apparatus primarily developed for the purpose of efficiently lifting, positioning, and transporting a wheel to and from a wheel hub, tire changer, and tire balancer and can be used on low-rise lifts and post lifts.

SUMMARY

In view of the foregoing disadvantages inherent in the known types of wheel lift devices now present in the prior art, the present invention provides a new wheel lift system construction wherein the same can be utilized for efficiently lifting, positioning and transporting a wheel to and from a tire changer, tire balancer, and wheel hubs of vehicles on low-rise lifts and post lifts.

The general purpose of the present invention, which will be described subsequently in greater detail, is to provide a new wheel lift system that has many of the advantages of the wheel lift devices mentioned heretofore and many novel features that result in a new wheel lift system which is not anticipated, rendered obvious, suggested, or even implied by any of the prior art wheel lift devices, either alone or in any combination thereof.

To attain this, the present invention generally comprises a support structure configured having three legs, and a wheel mounted at the end of each leg. A base block is mounted on the support structure, and an air actuator is mounted on the base block. A wheel carriage is mounted on the air actuator, the air actuator being configured for facilitating vertical lift of the wheel carriage.

In one embodiment, two of the legs of the support structure extend at an upward angle at the ends thereof for allowing access to accommodate automotive low-rise lifts.

In another embodiment, two of the legs of the support structure form a "C shape and a third leg extends away from a mid-portion of the "C" shape.

In yet another embodiment, the base block is rotatably mounted on the support structure to allow the wheel carriage to rotate about a vertical axis with respect to the support structure.

In yet another embodiment, the air actuator further comprises an air cylinder and a plug sealing a lower end of the air cylinder. A cylindrical actuating rod is slidably mounted within the air cylinder. A carriage support tube is slidably mounted on an exterior surface of the air cylinder, and the wheel carriage is mounted on the carriage support tube. A cap fixedly couples an upper end of the carriage support tube to an upper end of the cylindrical actuating rod. An internal piston is fixedly coupled to a lower end of the actuating rod, and a damper piston is slidably positioned within the actuating rod. A liquid fluid is contained within an interior portion of the actuating rod above the internal piston, the fluid being sufficient to pass through the damping orifice and level off above the damper piston when the actuating rod and the internal piston are in a lowermost position. A gaseous fluid is contained within an air cylinder cavity of the air cylinder between the internal piston and the plug, the air cylinder cavity being configured for fluid communication with a source of pressurized air. A damper tube extends through the gaseous fluid, the plug, the liquid fluid, and the internal piston, the damper tube including a lower end being fixedly secured to a lower end of the air cylinder and an upper end fixedly secured to the damper piston to fix the position of the damper piston relative to the air cylinder. A needle rod coupled to and slidably extends from a lower end coupled to a control mechanism through the damper tube to an upper end proximate to a damping orifice of the damper piston, the control mechanism being configured for moving the needle rod upwardly to close the damping orifice and lock the actuating rod in place or downwardly to open the damping orifice and allow movement of the actuating rod.

In yet another embodiment, a needle rod is configured for controlling the size of the opening in the damping orifice, the size of the opening in the damping orifice corresponding to the degree of damping effected on vertical movement of the actuating rod.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a wheel lift system that will overcome the shortcomings of the prior art devices.

A second object is to provide a wheel lift system for efficiently lifting and positioning a wheel and tire onto a wheel hub, tire changing apparatus and tire balancer apparatus.

Another object is to provide a wheel lift system that can be used on vehicles that are on low-rise lifts.

An additional object is to provide a wheel lift system that does not require complex control devices or motors to operate.

A further object is to provide a wheel lift system that is easily maneuverable.

A further object is to provide a wheel lift system that lifts and lowers a wheel quickly.

Another object is to provide a wheel lift system that is relatively lightweight and compact in size.

Another object is to provide a wheel lift system that does not require winching, pumping or charging.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

Figure 1:
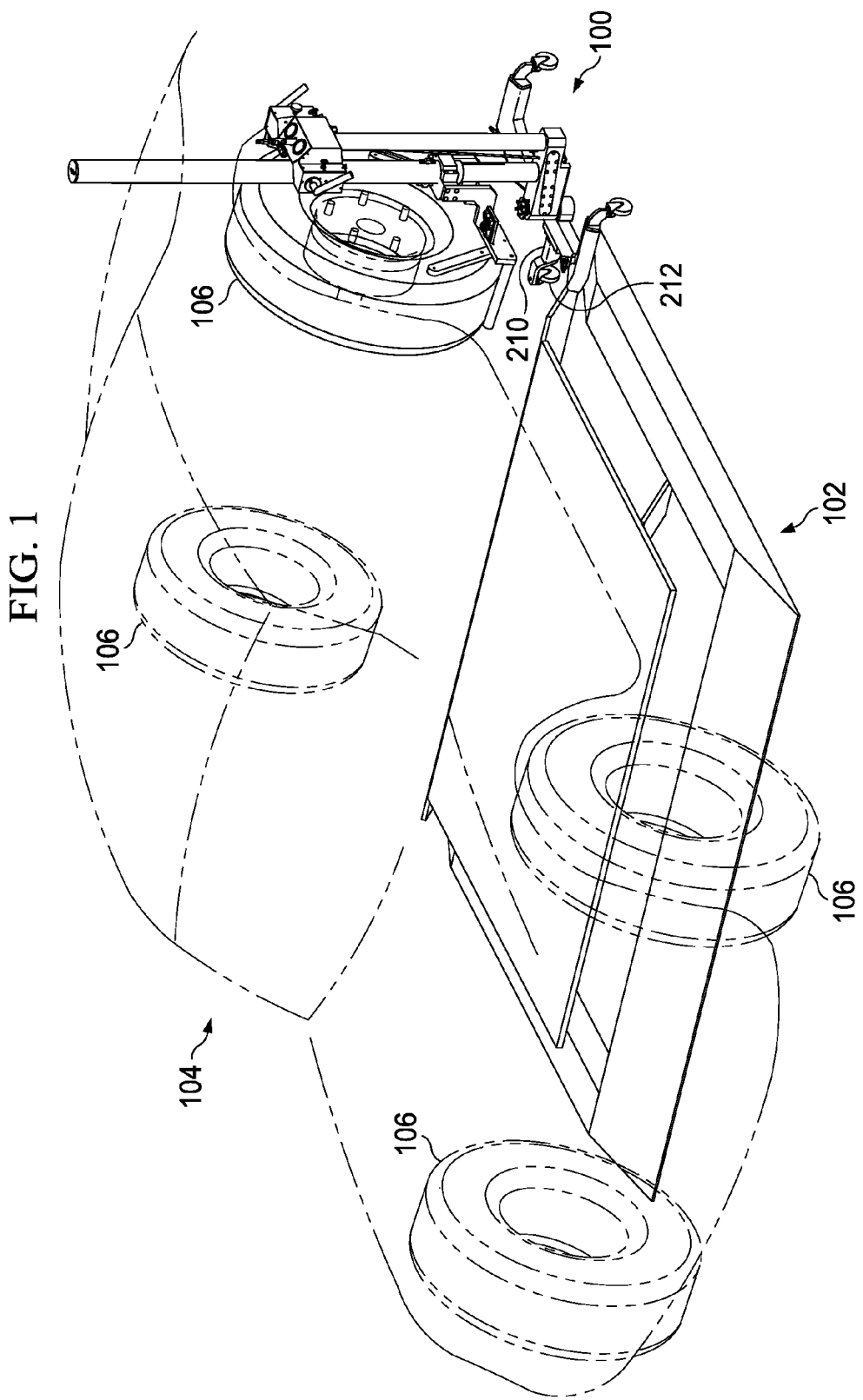
FIG. 1 is a perspective view exemplifying use of a wheel lifting dolly with a vehicle on a low-rise lift in accordance with principles of the present invention.

Referring to FIG. 1 of the drawings, the reference numeral 100 generally designates a wheel lifting dolly embodying features of the present invention, juxtaposed against a vehicle (e.g., car, truck) 104 being lifted by an automotive low-rise lift 102. The vehicle 104 includes four wheels and tires 106, one of which wheel and tire is depicted as being serviced (removed from or placed on car 104) by the wheel lifting dolly 100. The dolly 100 includes a number of features, discussed in further detail below.

1. Unique "Offset C-Bar" Leg Configuration

Figure 2:
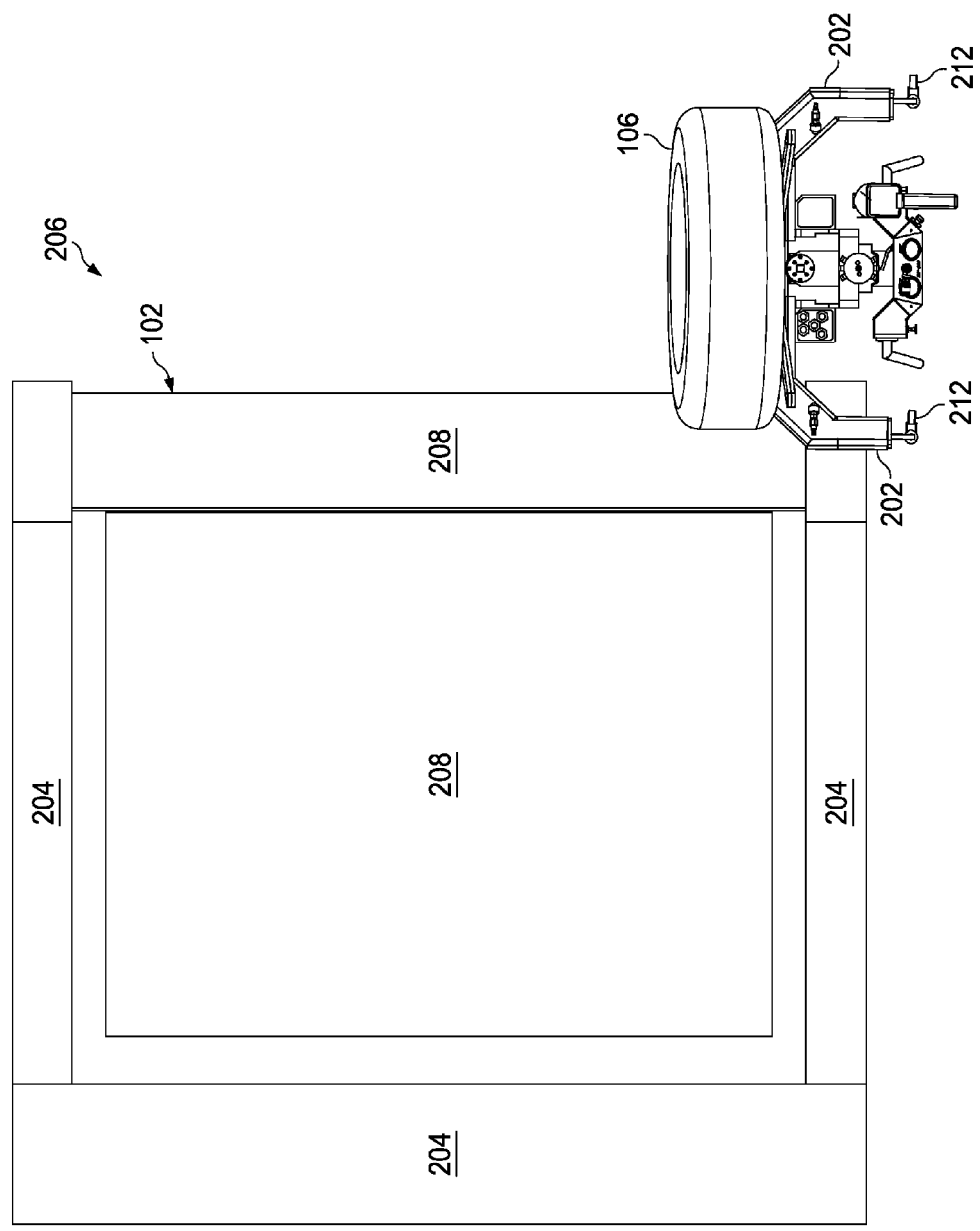
FIGS. 2 and 3 are plan and elevation views, respectively, of the car low-rise lift and the "Offset C-bar" leg configuration of the wheel lifting dolly of FIG. 1.
Figure 3:
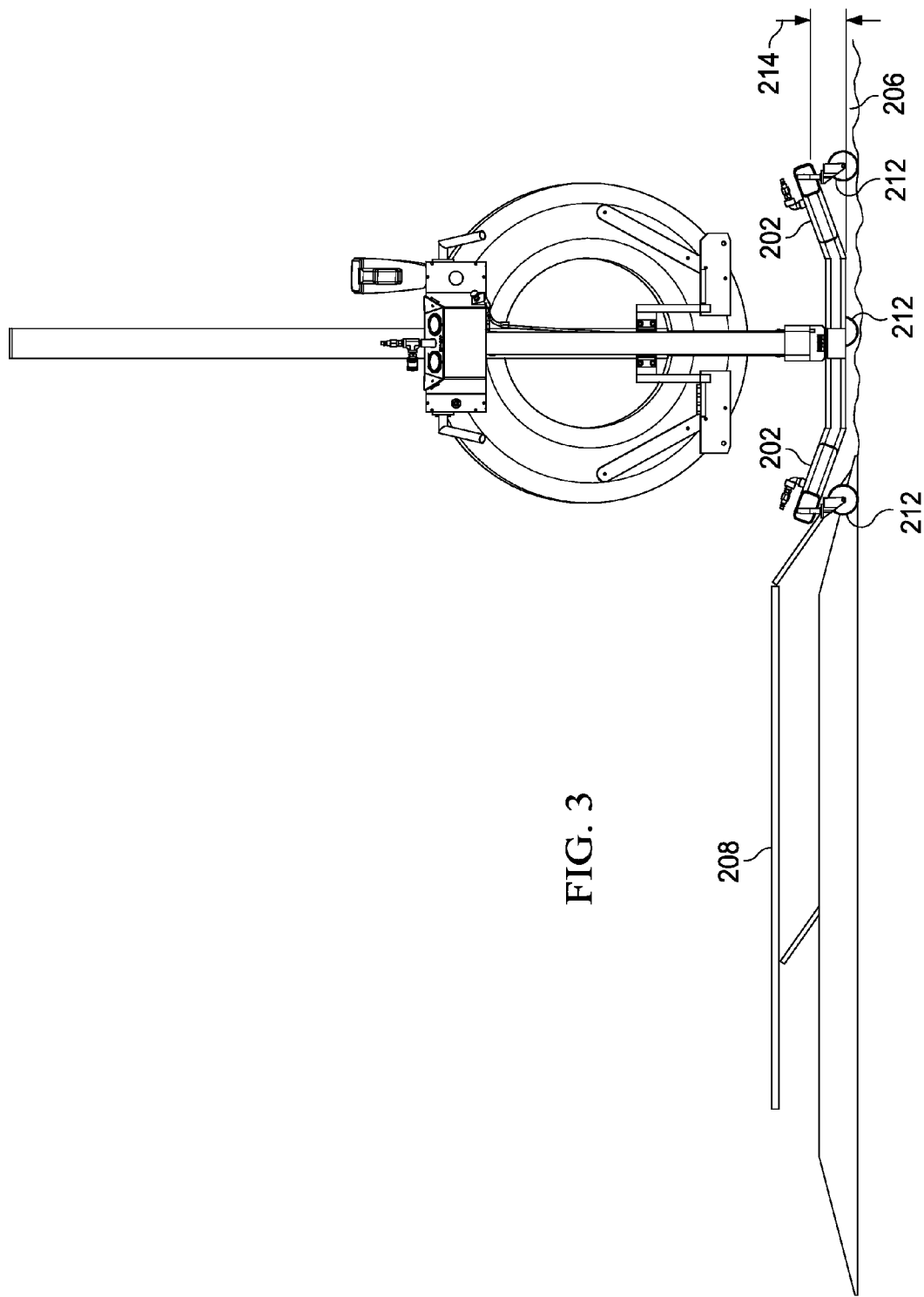
Figure 4:
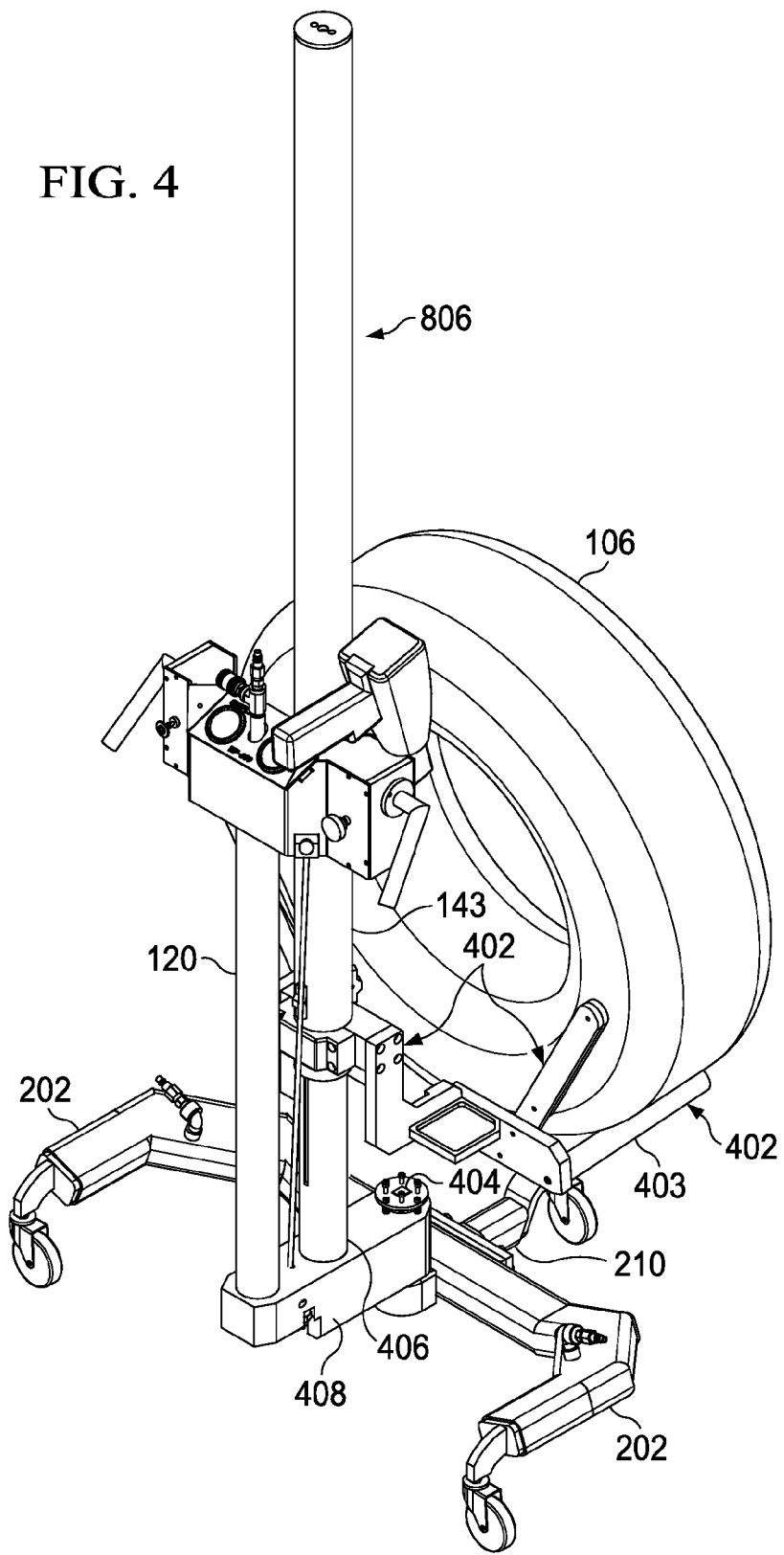
FIGS. 4-7 are perspective views depicting the dual configuration wheel lifting capability of the dolly of FIG. 1.

Referring to FIGS. 2 and 3, the wheel lift dolly 100 includes a unique support structure, or "Offset C-bar" leg configuration, 202 (best viewed in FIG. 2) which allows access to wheels of vehicles on automotive low-rise lifts 102. Low-rise lifts, or pad lifts, 102, comprise a generally rectangular fixed framework 204 attached to the floor 206 with a movable lifting framework (or pad) 208 inside of the fixed framework 204. The lifting framework 208 lifts the vehicle 104. Conventional mobile wheel dolly/lifting devices have been unable to access the wheels of vehicles on pad lifts because their supporting leg structures interfere with the pad lift framework. The wheel lift dolly 100 preferably incorporates the "Offset C" configuration 202 plus a single relatively short leg (or bar) 210 (FIG. 1) extending from the back of the "C" configuration 202. A caster wheel 212 is positioned at each end of the "C" shape and a third caster wheel 212 is positioned at the end of the single narrow leg (bar) 210. This unique design provides stable three point rolling contact with the floor and positions the single narrow supporting leg structure (bar) 210 directly under the wheel for support. But the bar leg 210 is narrow enough to avoid interference with the fixed pad lift frame. Additionally, unlike conventional wheel dollies that have leg framework members parallel to the floor, the "C" portion 202 of the leg framework design preferably incorporates a "vertical offset" 214 (FIG. 3) (a "non-parallel to floor" section to direct the leg framework upward) to provide clearance over the top of the fixed framework 204 and movable lifting framework 208 as the dolly 100 engages (approaches) the vehicle 104 wheel 106 to install or remove wheels 106 from a vehicle 104 on a pad lift 102. The unique supporting leg structure combination of the "Offset C" configuration 202 and the single narrow leg "bar" 210 satisfies the need for a dolly leg structure that can interface with wheels of vehicles on pad lifts.

2. Dual Configuration Wheel Lifting Capability

Figure 5:
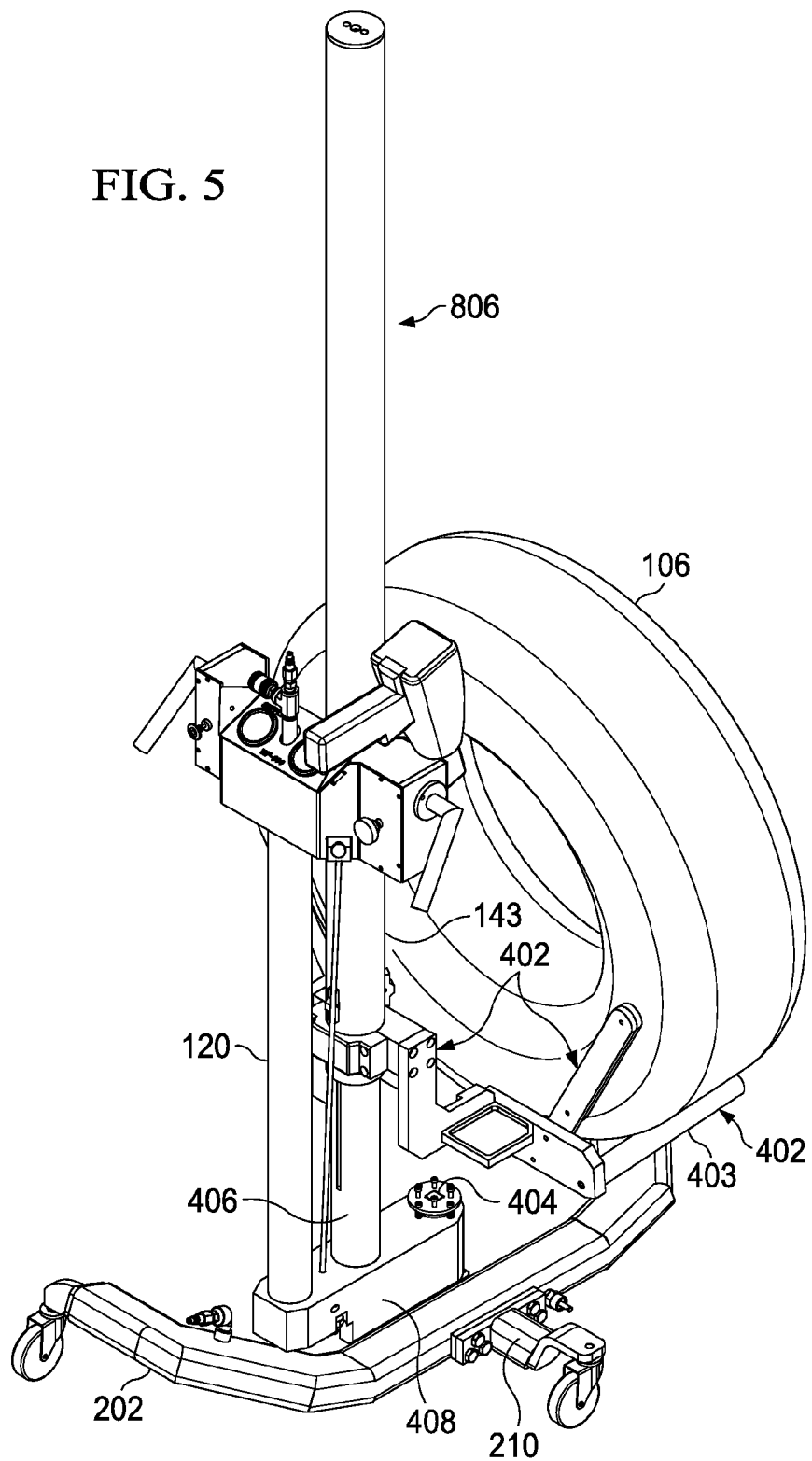
Figure 6:
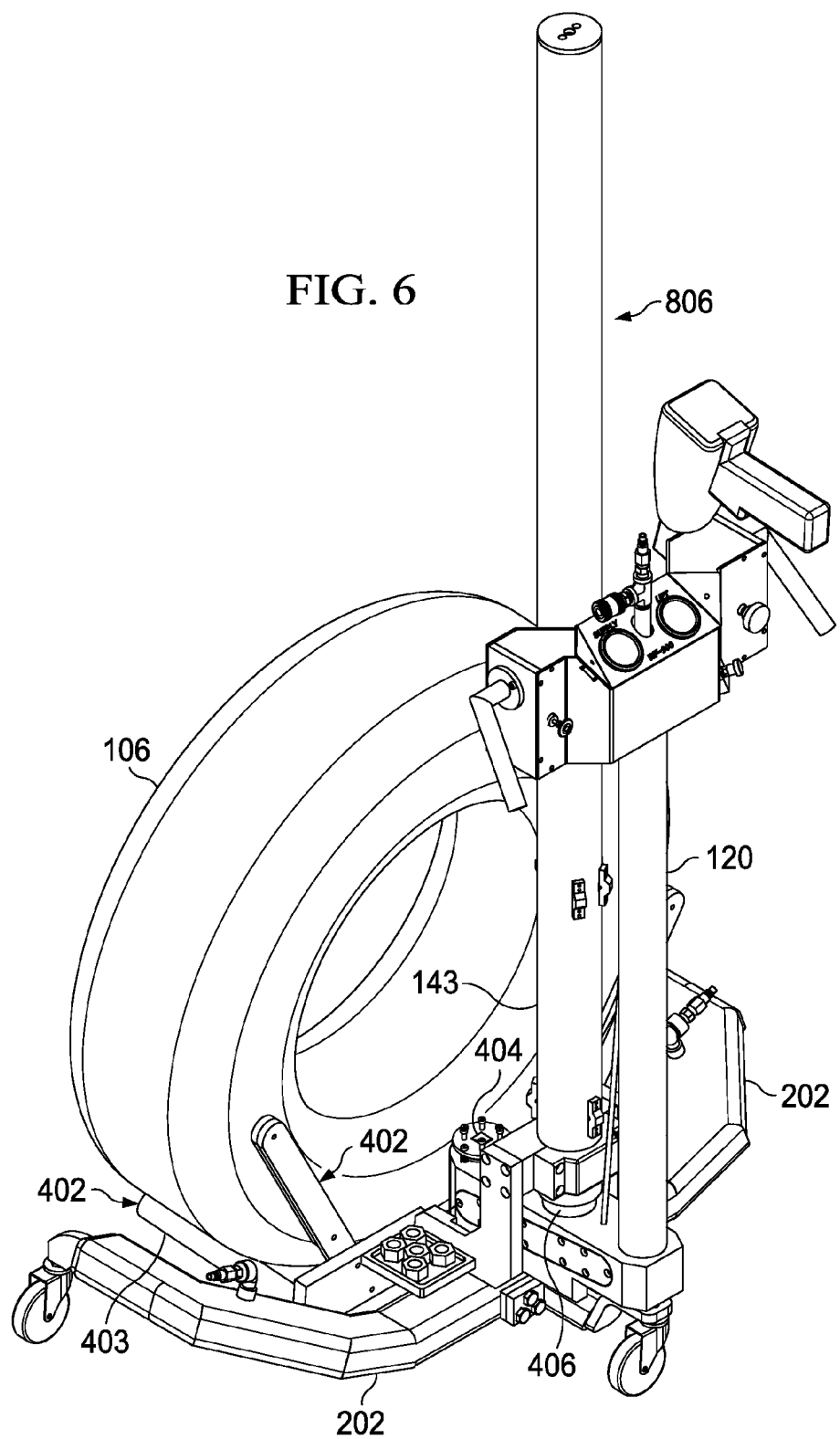
Figure 7:
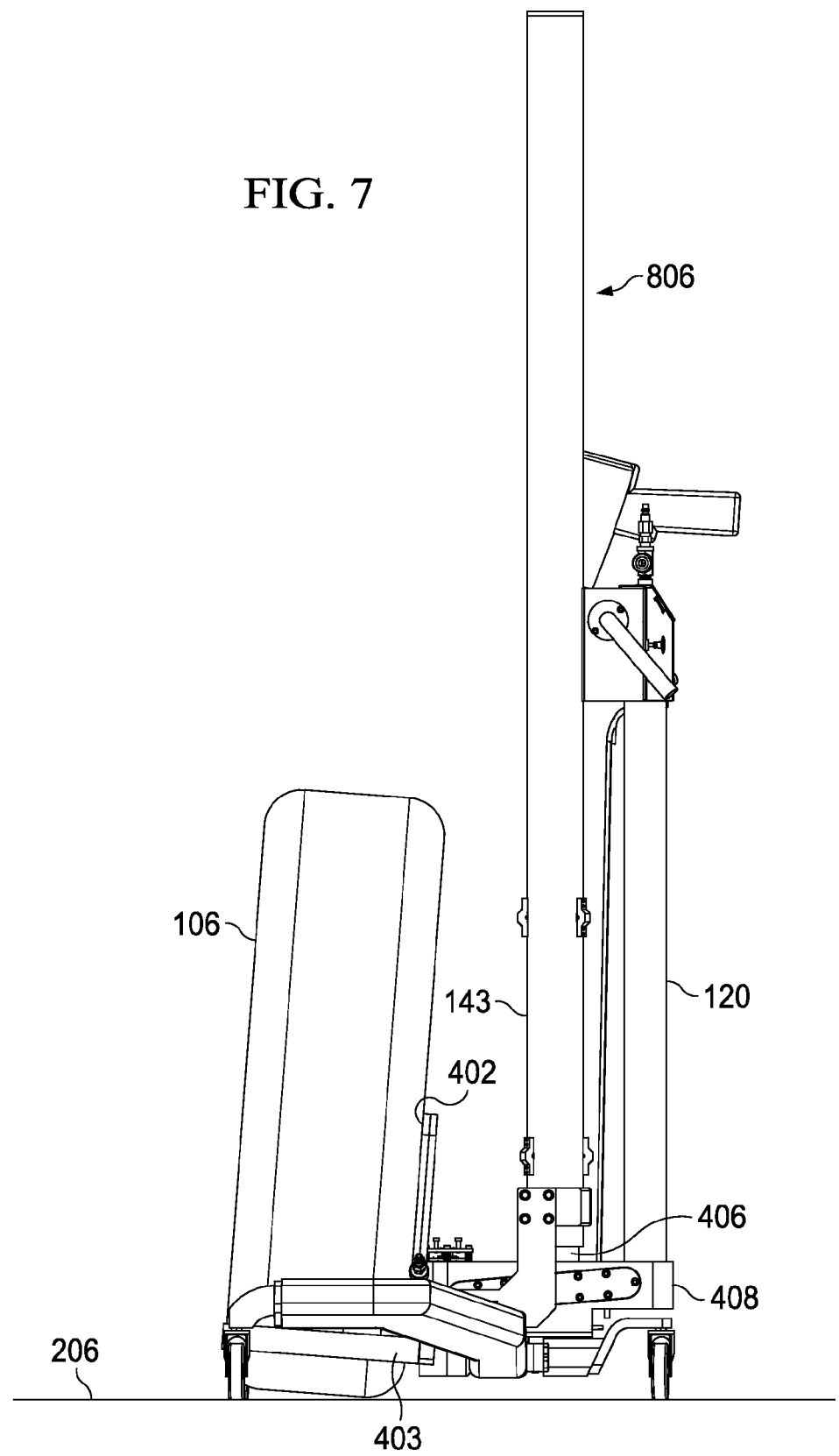

FIGS. 4-7 are perspective views of the dolly 100. As shown therein, an air actuator 806 (discussed in further detail below with respect to FIGS. 8A and 8B, and often referred to by those skilled in the art as an "air cylinder," a term used with more limited meaning herein), comprises a base block 408 rotatably mounted to the offset C-bar leg configuration 202, an air cylinder 406 mounted to the base block 408, a carriage support tube 143 slidably mounted to the air cylinder 406, and a wheel lifting carriage 402 mounted to the carriage support tube 143. FIGS. 4-7 further illustrate how the dolly 100 is capable of lifting a wheel in either of two independent and beneficial configurations established through the relative rotation between the "offset C-bar" leg structure 202 relative to the wheel lifting carriage 402. In a first configuration, depicted by FIG. 4, the single leg bar 210 is positioned under the wheel carriage 402, which allows access to the wheels 106 of a vehicle 104 on pad lifts 102. As depicted by FIG. 5, the wheel carriage 402 is rotated 90° (half way to the second configuration) about a pivot shaft 404 rigidly attached to the leg structure 202. In a second configuration, depicted by FIG. 6, the wheel carriage 402 is rotated 180° about the pivot shaft 404, relative to FIG. 4, so that the "offset C" portion of the leg structure 202 is positioned under the wheel carriage 402, which, as best viewed in FIG. 7, allows for wheels 106 to be picked up from the floor 206, which is very helpful for heavy wheels. To change from the first configuration to the second configuration, the leg structure 202 is rotated about the rigidly attached pivot shaft 404. The pivot shaft 404 is held fixed to the leg structure 202, but allowed to rotate, preferably by two bearings (not shown) housed within a base block 408, which is always clocked in alignment with the wheel lifting carriage. The bearings facilitate smooth and easy rotation for the operator. It can be appreciated that either the leg structure 202 can rotate relative to the wheel carriage 402, or the wheel carriage 402 can rotate relative to the leg structure 202.

It is noted that the wheel carriage 402 is mounted to the carriage support tube 143 in any conventional manner, as known to those skilled in the art, such as by way of clamps secured to the carriage support tube 143. The wheel carriage 402 preferably includes rollers 403 which extend outwardly for supporting a wheel. The rollers 403 also preferably "roll" to allow a wheel supported by them to roll into position. Still further the rollers 403 are preferably angled (FIG. 7) slightly upwardly to use gravity to bias a wheel to rest on the wheel carriage 402.

3. Unique Compact Oil Damping Configuration

Figure 8A:
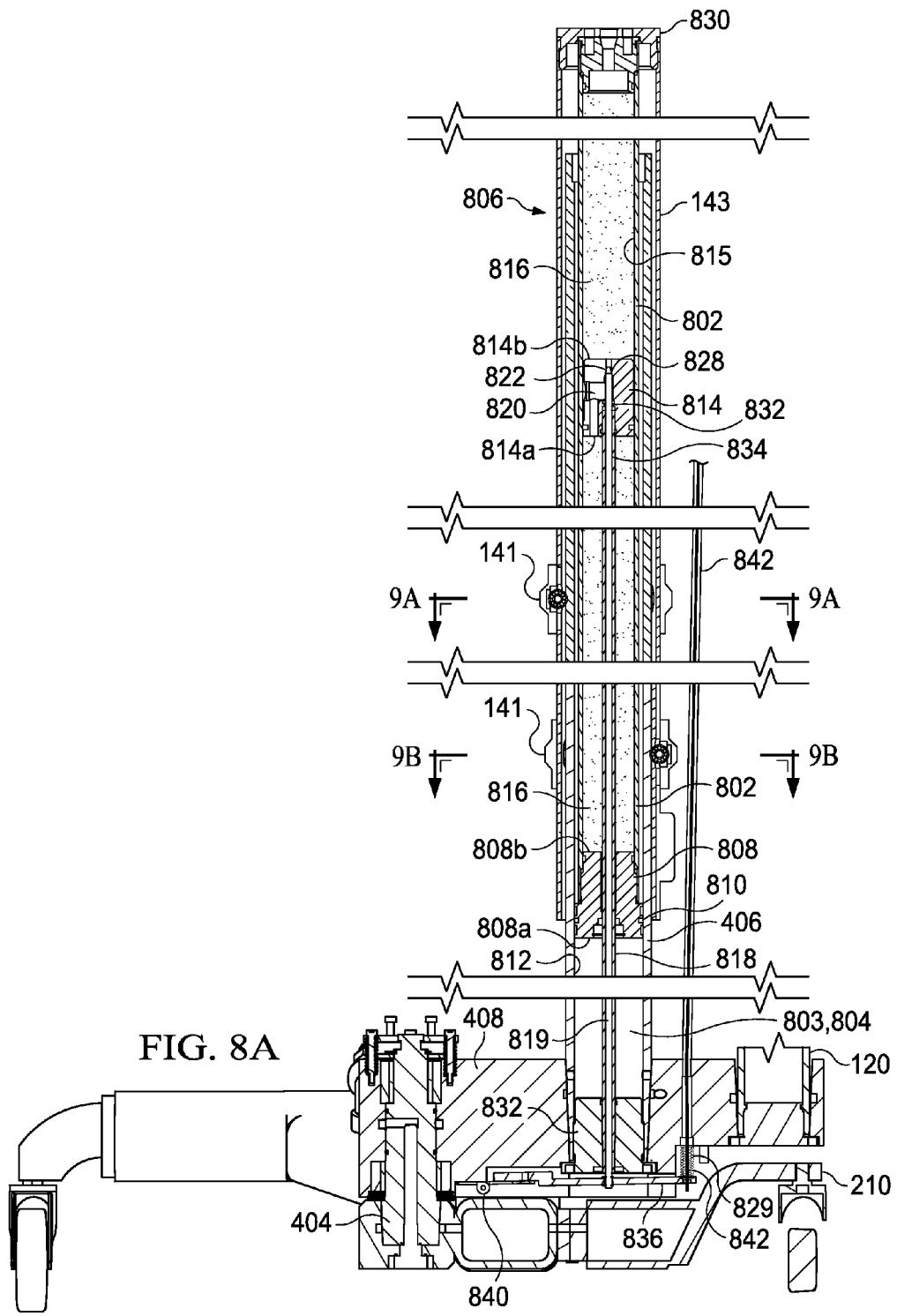
FIGS. 8A and 8B are cross-sectional views of an air actuator utilizing a novel oil-damped speed controlled actuating rod of the dolly of FIG. 1.
Figure 8B:
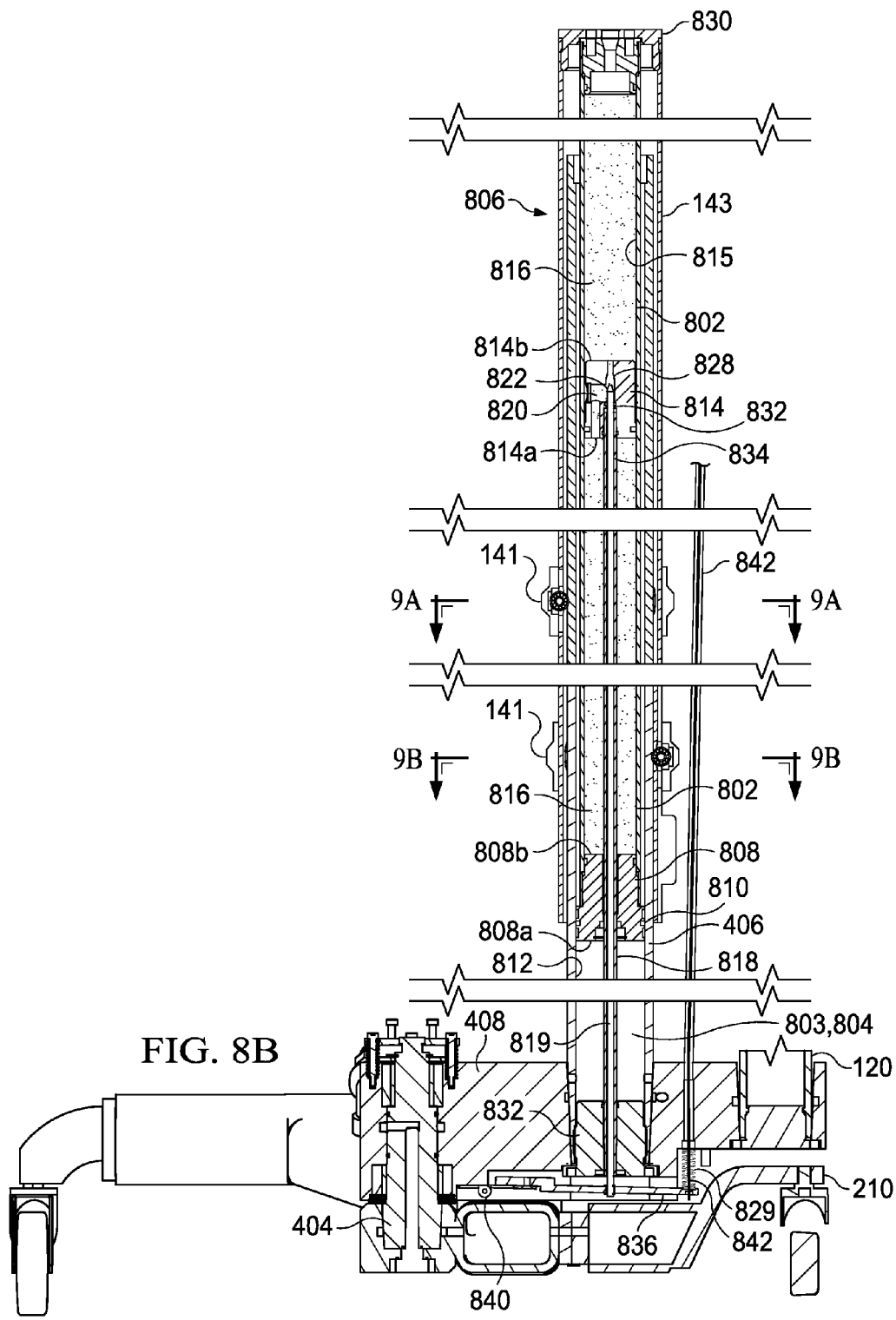
Figure 9A:
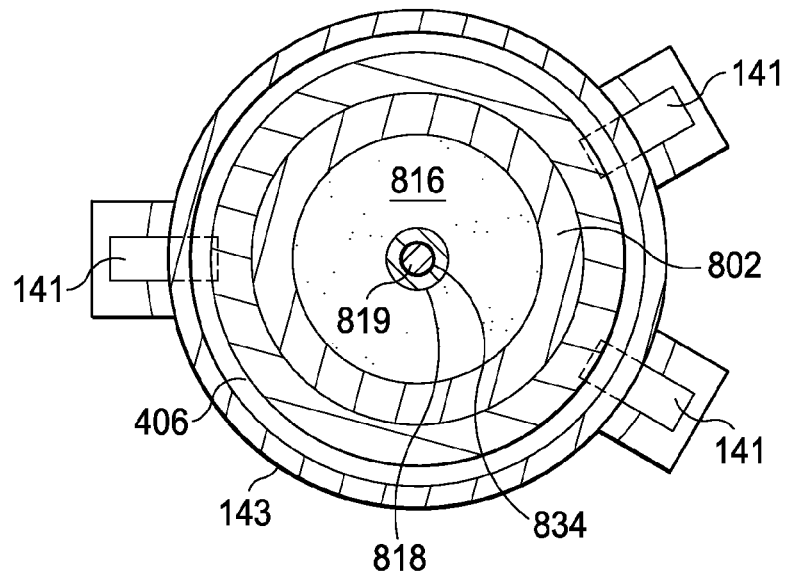
FIGS. 9A and 9B depict ball bearing rollers taken along the lines 9A-9A and 9B-9B, respectively, of FIGS. 8A and 8B, and are utilized in the dolly of FIG. 1 for aligning a carriage support tube to an air cylinder.
Figure 9B:
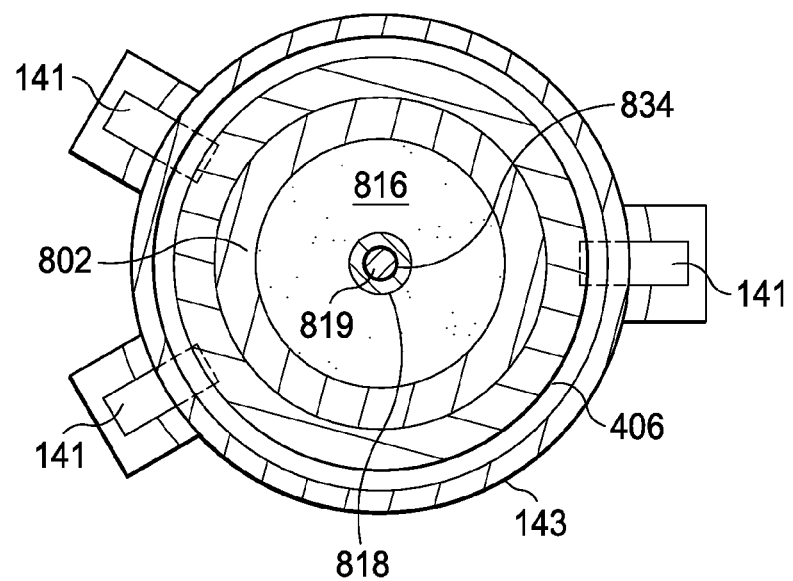

FIGS. 8A, 8B are cross-sectional views of the air actuator of the dolly 100. Because air is compressible, like a spring, special care must be taken to avoid uncontrolled rapid movement of objects being actuated by an air actuator. To avoid such uncontrolled rapid movement, the present invention utilizes a unique compact oil damping configuration. Accordingly, an internal piston 808 and a cylindrical actuating rod 802 connected to the internal piston 808 are slidably positioned within the air cylinder 406. The cylindrical actuating rod 802 is fixedly coupled to the carriage support 143 by way of a cap 830 so that up or down movement of the cylindrical actuating rod 802 synchronously moves the carriage support 143, as well as the wheel carriage 402, up or down. The lower end of the air cylinder 406 is sealed with a plug 832 and air cylinder cavity 803 of the air cylinder 406 between the internal piston 808 and the plug 832 is preferably filled with a fluid, preferably even a gas, such as air, 804, and the interior 815 of the actuating rod 802 above the internal piston 808 is preferably filled with a fluid, preferably even a liquid, such as oil, 816, to a level above a damper piston 814, discussed below. O-rings or similar seals 810 encircle the internal piston 808 creating a tight seal between the internal piston 808 and the air cylinder wall 812 to prevent the leakage of air 804 from one side of the piston 808 to the other side. Applying higher pressure to one side 808a of the internal piston 808 than the other side 808b causes the internal piston 808, attached actuating rod 802, and carriage support 143 to move upward. The present invention preferably incorporates a conventional air actuator 806, modified to include the placement of a fixed damper piston 814 and oil 816 inside the actuating rod 802. The fixed damper piston 814 is held by a damper tube 818 passing through the internal piston 808, the lower end of the damper tube 818 being fixedly secured to the plug 832 that is fixedly secured to the lower end of the air cylinder 406. The oil 816 placed inside the actuating rod 802 must pass through the fixed damper piston 814 in order for the actuating rod 802 and attached carriage support 143 to move up or down. The oil 816 flows from one side 814a of the fixed damper piston 814 to the other side 814b through a passageway 820 with a small orifice (a damping orifice) 822 which restricts the oil flow rate. This in turn restricts the speed of the actuating rod 802 and prevents uncontrolled rapid movement of the actuating rod 802 and carriage support 143. This novel arrangement of the fixed damper piston 814 inside the actuating rod 802 with oil placed both above and below this fixed damper piston 814 results in an oil damped air actuator design of shorter length than conventional designs placing oil in spaces outside the moving actuating rod or in spaces that require adding length to the air actuator assembly.

Figure 11:
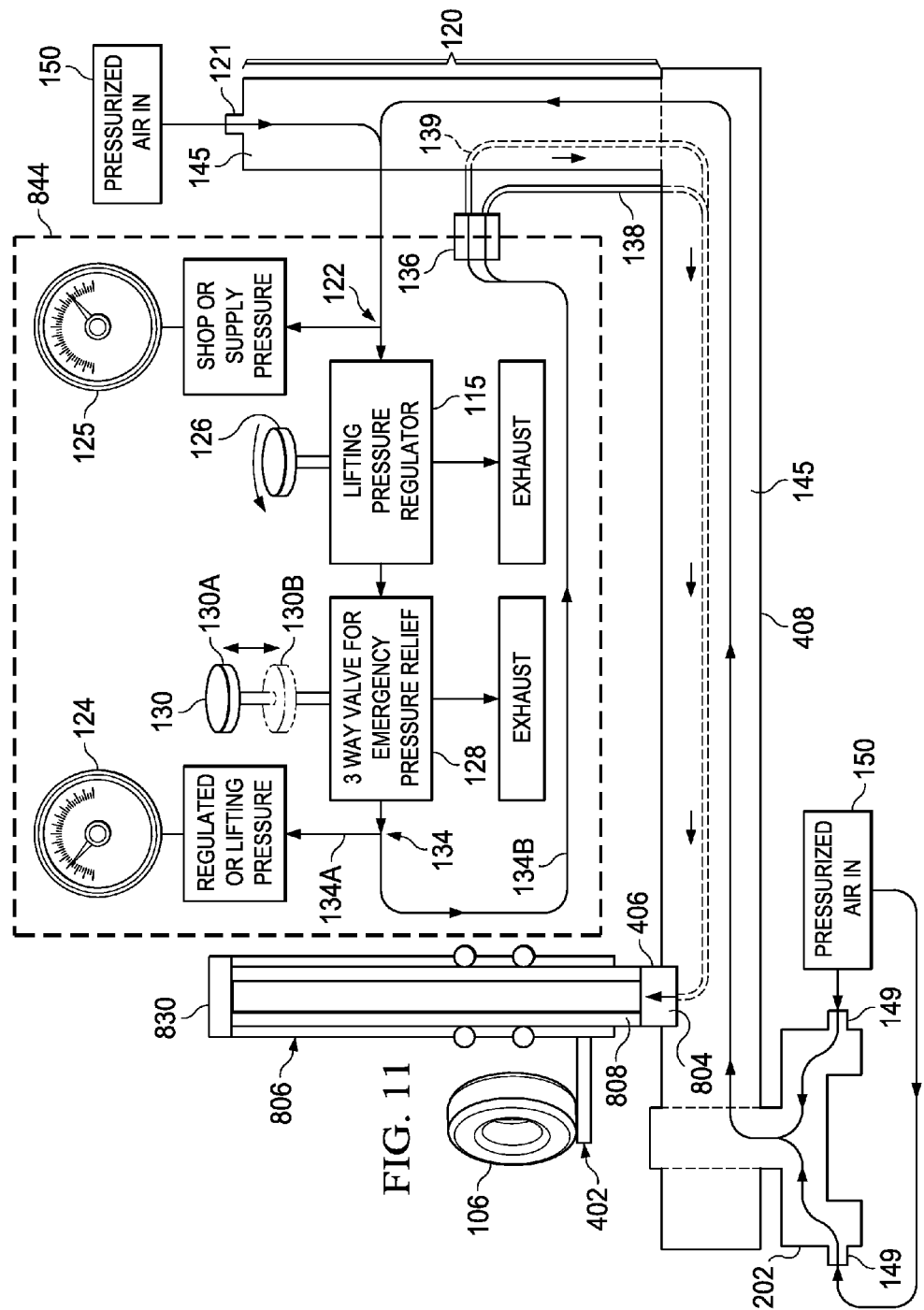
FIG. 11 is a schematic diagram showing pneumatic lines of the dolly of FIG. 1.

While shown more clearly in FIG. 11, at least one of air passages 138 and 139 are preferably provided for facilitating the passage of air from the air storage cavity 145 to cavity 803 to push the internal piston 808 upwardly. There are at least two ways to relieve pressure to lower the wheel carriage 402. First, the carriage may be lowered by decreasing the regulated pressure using the regulator 115, which has the ability to exhaust air from the cylinder thereby lowering the carriage. Second, the carriage may be lowered by opening the emergency relief valve 128, which also exhausts the cylinder, thereby lowering the carriage.

It is noted that the total available volume for oil both above and below the fixed damper piston 814 changes as the internal piston 808 and actuating rod 802 move up and down. This is because in the downward most position, the total available volume for oil is reduced by the volume of the damper tube 818 extending between the internal piston 808 and the damper piston 814. Thus, as the internal piston 808 and actuating rod 802 move up, the volume of oil space taken up by the damper tube 818 decreases and the total available volume for oil increases. However, as the internal piston 808 and actuating rod 802 move down, the volume of oil space taken up by the damper tube 818 increases and the total available volume for oil decreases. Since the total volume of oil does not change, it can be appreciated that when the volume available for the oil increases, a vacuum is created equal to the volume available for the oil less the actual volume of the oil. Thus, with the internal piston 808 and actuating rod 802 in the downward most position, oil completely fills the space below the fixed damper piston 814 and fills almost all of the space above the fixed damper piston. However, with the actuating rod in the upward most position, the total available volume above and below the fixed damper piston 814 increases even though the volume of oil remains the same. This creates a small vacuum space that can reside either above or below the fixed damper piston 814, depending on the loading condition. This vacuum volume is a maximum at the upward most position of the actuating rod and gradually diminishes to near zero volume at the downward most position of the actuating rod.

In an alternative embodiment, the aforementioned vacuum space is eliminated by utilizing a telescoping rod between the top of the fixed piston and the cap at the top of the actuating rod. The diameter of this telescoping rod would be sized appropriately to equalize the available volume for oil at both the upward most position of the actuating rod and the downward most position of the actuating rod. This telescoping rod would eliminate the vacuum space by making the total volume space for oil constant throughout the full actuating stroke of the device.

4. A Damping Oil Flow "Shut-Off" Control as Actuating Rod Locking Mechanism.

Within the fixed damper piston 814 this design incorporates a damping oil flow "shut-off" control valve 828 which opens and closes a small orifice (the damping orifice) 822. If the valve 828 is closed, the oil cannot flow through the orifice 822 and the actuating rod 802 is locked in place. Unique to this design is the arrangement of components that enable the valve 828 to function. The actual valve 828 opening and closing surfaces are like that of a needle valve. But the needle rod 819 is uniquely packaged in this design. It is attached at a lower end to a control mechanism, such as a pivoting plate 836, and passes through the center of the damper tube 818 which is used to support the fixed damper piston 814 (inside the actuating rod). A seal 832 between the needle rod 819 and the damper tube 818 prevents oil 816 from escaping down an annular space 834 defined between the needle rod 819 and the damper tube 818. The upward and downward movement of the needle rod 819 (which opens and closes the valve 828), is preferably controlled by the movement of the pivoting plate 836 which is preferably pivotally secured on one end via a hinge 840 mounted to a lower portion of the base block 408 (shown) or of the air cylinder 406 (not shown), and on an opposing end via a spring 829 and an actuating cable 842, and is connected to the needle rod 819 interposed between the hinge 840 and the actuating cable 842. As seen most clearly in FIG. 12. the actuating cable 842 connects to the pivoting plate 836 on one end and travels upward to a control housing 844 where it is preferably attached to an acme nut 846. The acme nut 846 is driven by an acme threaded rod 848 which is fixed to a hand knob 850 that protrudes out of the control housing 844 toward an operator (not shown). When the operator turns the knob 850 preferably clockwise, it turns the acme threaded rod 848, which in turn moves the acme nut 846 along the acme threaded rod 848, which in turn pulls the cable 842 upward, which in turn pulls the pivoting plate 836 upward, which in turn pushes the needle rod 819 upward, which in turn closes the valve 828 inside the fixed damper piston 814. Turning knob 850 counterclockwise reverses this action with the aid of spring 829 that is positioned over the cable between the pivoting plate and the base block. With the valve 828 closed, the oil 816 cannot flow from one side of the fixed damper piston 814 to the other and therefore it prevents the actuating rod 802 from moving. Locking of the actuating rod will be useful in various situations. One example is when a heavy wheel is temporarily removed from the lifting device (i.e., at the balancing machine or tire changing table). Without the locking feature, once the wheel weight is removed, the wheel carriage would begin to rise upward since the lifting pressure and wheel weight are no longer in balance. The lock prevents this from happening.

5. Damping Oil Flow "Shut-Off" Valve as a Throttle to Control Slow Movements.

The shut-off valve 828 can also be used as a throttle providing slow lift or slow lower capability. The present invention allows the operator to barely open the shut-off valve 828 by barely turning the hand knob 850. This in turn will allow the actuating rod 802 to move, but only very slowly. This feature can be very useful in positioning loads using air actuators.

6. "Both Hands on Wheel" for Raising or Lowering of Wheel—FIGS. 10 and 11

When installing heavy wheels onto vehicles, it is necessary to precisely align the wheel with the vehicle hub. Even a slight misalignment can prevent the wheel from easily attaching onto the vehicle hub. Therefore, two hands are preferred for aligning and attaching a wheel onto a vehicle hub. However, such is not possible with conventional wheel lifting devices because they require that an operator use at least one hand to push a button or move a lever or knob to effect upward or downward adjustments in wheel height. This is because conventional wheel lifting devices are not designed to maintain the optimum "balanced air pressure" to facilitate effortless upward or downward movement driven only by the operator's hands on the wheel or wheel carriage, i.e., without the operator needing to touch a control device (e.g., a button, knob, lever).

The present invention allows an operator, after making an initial air pressure adjustment (i.e., setting the optimum balanced air pressure) and with minimal exertion of force from the operator (e.g., less than 25 pounds of force to move an 80 pound wheel), to lift or lower a wheel over a full range of travel (e.g., over forty inches of vertical travel) of the device without touching any controls, such as control knobs, buttons, toggles, or the like. With the present invention, both operator's hands are free to assist with the alignment and installation of the wheel onto the vehicle hub.

This advantage allowing "hands on wheel height adjustment capability" is accomplished by balancing the lifting force provided by air pressure under the piston 808 inside an air cylinder 406 with the weight of the wheel 106, as well as moveable lifting parts of the device, and maintaining that balance even as the operator lifts the wheel up higher or pushes the wheel down lower. This ability to maintain the balance of the weight of the wheel with air pressure in the air cylinder enables the operator to continue to move a heavy wheel short distances (e.g., fractions of an inch) up or down as well as long distances (over forty inches) up or down without touching an air control valve, button, toggle, or switch.

In accordance with principles of the present invention, and as most clearly depicted by FIG. 11, the output from a source of air pressure (e.g., an air compressor) is coupled directly through an adjustable air pressure regulator 115 to the air cylinder cavity 803 of the air cylinder 406. Adjusting the air pressure regulator 115 according to the procedure outlined herein sets the initial optimum balanced air pressure, i.e., the pressure at which it is easiest to lift the wheel up or push it down by hand.

To set the optimum balanced pressure in a preferred embodiment, the wheel is first positioned on the wheel carriage 402 of the wheel lift dolly 100. Air pressure in the air cylinder cavity 803 of the air cylinder 406 is then increased sufficiently to overcome the weight of the wheel 106 and moving device parts, as well as the friction in the seals, until the internal piston 808, actuating rod 802, carriage support 143, wheel carriage 402, and wheel 106 begin to move upward. The air pressure is allowed to lift the wheel 106 upward a short distance and then the air pressure is slowly decreased until the wheel carriage 402 stops moving. The pressure reading on the regulated air gage 124 at which the wheel carriage 402 stopped moving upward is noted. The air pressure is then preferably reduced approximately 5% from that reading, at which point the air pressure is "balanced." With the air pressure balanced, the operator can manually (i.e., without touching any controls) move the wheel up or down by applying to the wheel 106 or wheel carriage 402 with his/her hands, a small amount of force (e.g., less than 25 pounds to move an 80 pound wheel).

The air pressure regulator 115 preferably has high accuracy and rapid corrective response to downstream pressures above or below the balanced pressure, and a high exhaust capability. Once the balanced pressure is set for any weight wheel, the regulator 115 reacts to any pressure change, quickly and automatically adjusting the pressure back to the set balance pressure. If the operator manually pushes the wheel 106 downward, the pressure in the air cylinder 406 is increased. The regulator 115 quickly exhausts air to reduce the pressure back to the set balanced pressure, allowing the operator to continue to lower the wheel 106 by hand with little effort. Similarly, if the operator lifts the wheel 106 upward, the pressure in the air cylinder 406 is reduced. The regulator 115 quickly adds air to increase the pressure back to the set balanced pressure. This allows the operator to continue lifting the wheel 106 by hand with little effort.

FIG. 11 is a schematic drawing depicting the air plumbing for the dolly 100. Accordingly, the control housing 844 is preferably mounted on top of the control housing column 120. The column 120 is preferably used to store and provide pressurized shop air (e.g., 80 to 100 psi) for use with the wheel lift dolly 100. Pressurized air, i.e., shop air, 150 is preferably supplied to the column 120 via the leg structure 202 (discussed in further detail below with respect to the section entitled "8. On board air storage") or from the air supply plug 121 pointing upward at the top of the column 120 (above the control housing 844). Inside the control housing 844, shop air preferably comes out of the column 120 and immediately runs through a "T" fitting 122. The shop air 150 then preferably flows along two paths. One path goes to the pressure gage 125 to indicate to an operator (not shown) the pressure of the shop air. The second path goes to the air pressure regulator 115. A control knob 126 of the regulator 115 preferably protrudes out of the control housing 844 for the operator to turn and adjust the pressure coming out of the regulator 115. It can preferably be adjusted from 0 psi to full shop pressure (e.g., 80 to 100 psi) by turning the knob. Regulated air leaves the regulator 115 and is preferably routed to an emergency relief valve 128. A button 130 on the emergency relief valve 128 preferably protrudes out of the control housing 844 toward the operator and can be positioned in an outward position 130A for normal operation or in an inward position 130B to release all air from the air cylinder 406 in case of emergency. With the button 130 in the outward position 130A, regulated air preferably passes through the emergency relief valve 128 and into a "T" fitting 134. One leg 134A of the "T" 134 preferably directs air to the air gage 124 showing the current regulated air pressure (used in balancing procedure discussed above). The second leg 134B of the "T" 134 preferably goes to an exit fitting 136 at the bottom of the control housing. Air passes through the exit fitting 136 and down a tube 138 along the side of the control housing column 120. Alternatively, a tube 139 could be located on the inside of the control housing column which would serve to protect the tube and give the equipment a more elegant streamlined appearance. The tube 138 is then connected to the base block 408 at a port that directs passage of air into the air cylinder.

7. Six Ball Bearing Rollers—FIGS. 8A-10

FIGS. 8A-10 depict two sets of three ball bearing rollers 141. FIG. 9A depicts a cross-section of a first set of the two sets of three ball bearing rollers 141, taken along the line 9A-9A of FIGS. 8A and 8B, and FIG. 9B depicts a cross-section of a second set of the two sets of three ball bearing rollers 141, taken along the line 9B-9B of FIGS. 8A and 8B.

The two sets of three ball bearing rollers 141 are preferably utilized in the dolly of FIG. 1 and spaced apart by about ten to fourteen inches for aligning and centering the carriage support tube 143 over the air cylinder 406. This greatly helps support the moment load when the actuating rod 802 is extended. This moment supporting configuration takes a substantial load off the seals 810, thereby extending their lifetime.

8. On Board Air Storage

Figure 10:
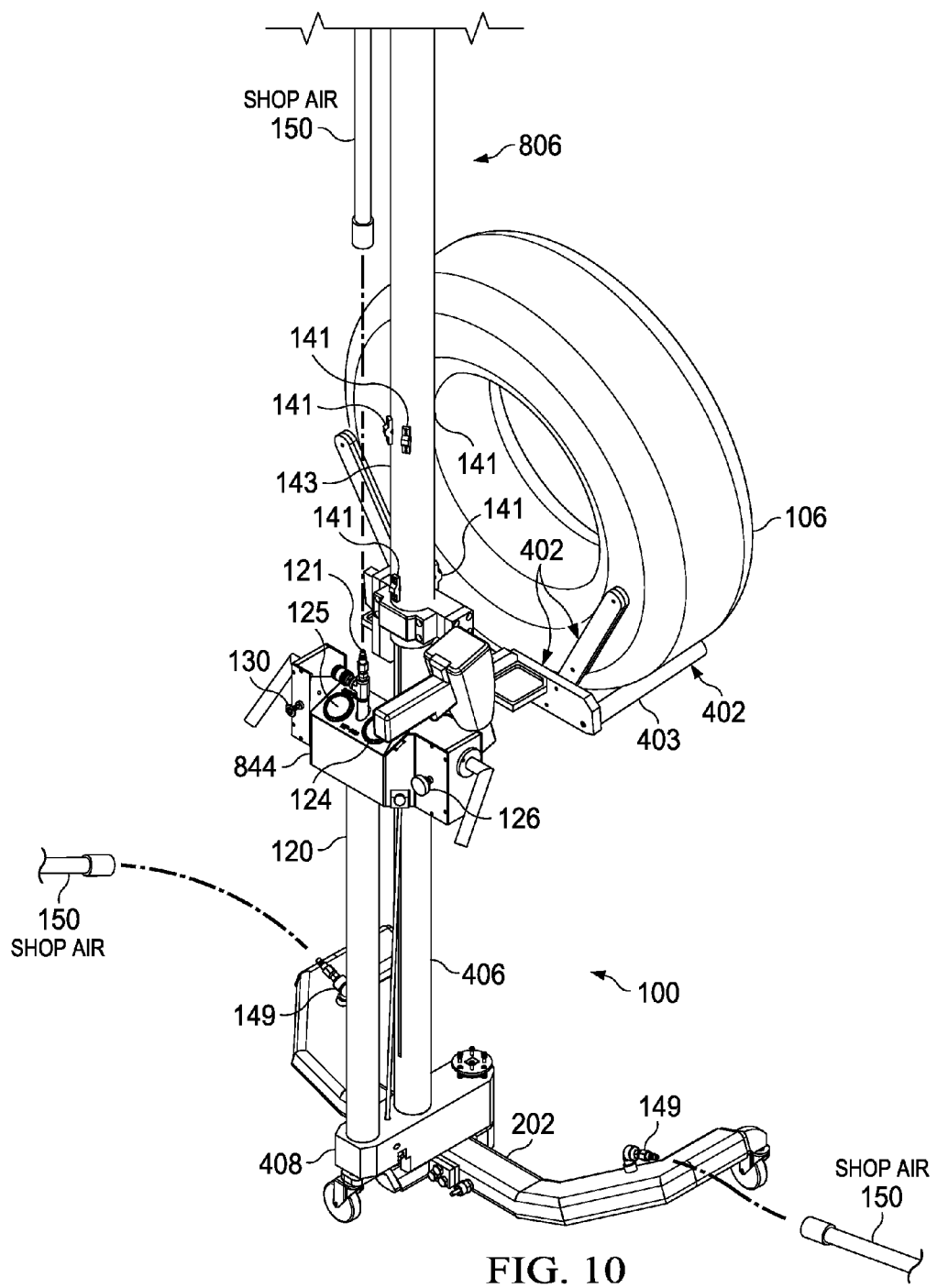
FIG. 10 is a perspective view of the dolly of FIG. 1 showing the control panel thereof.
Figure 12:
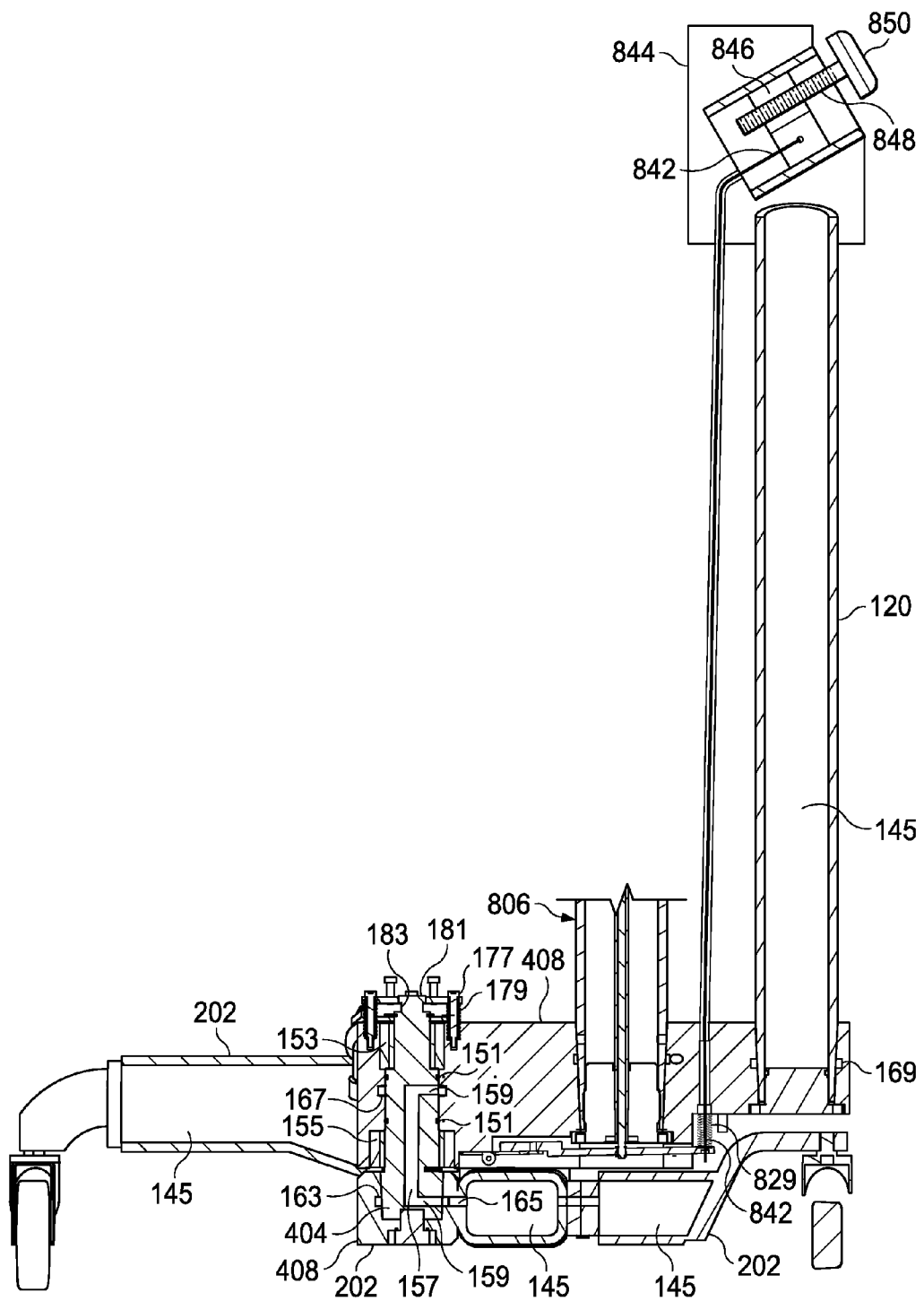
FIG. 12 is a cross-sectional view of the dolly of FIG. 1 showing on-board air storage compartments.
Figure 13:
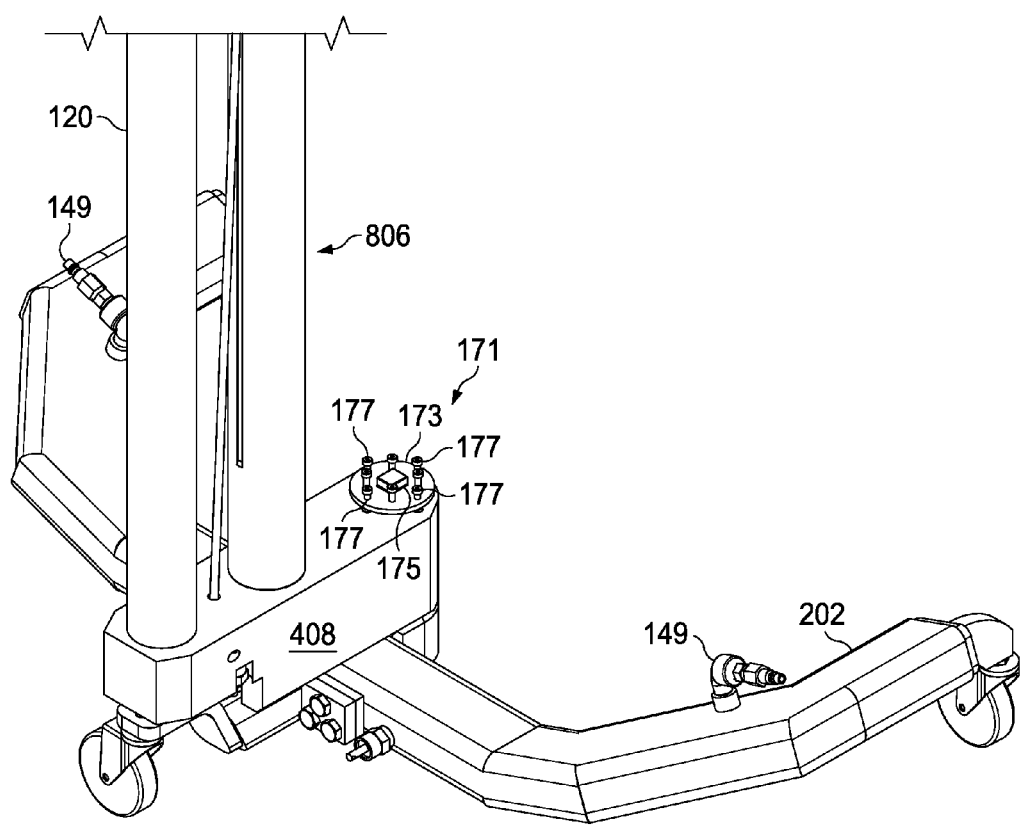
FIGS. 13-15 depict a foot-activated lock mechanism of the dolly of FIG. 1.
Figure 14:
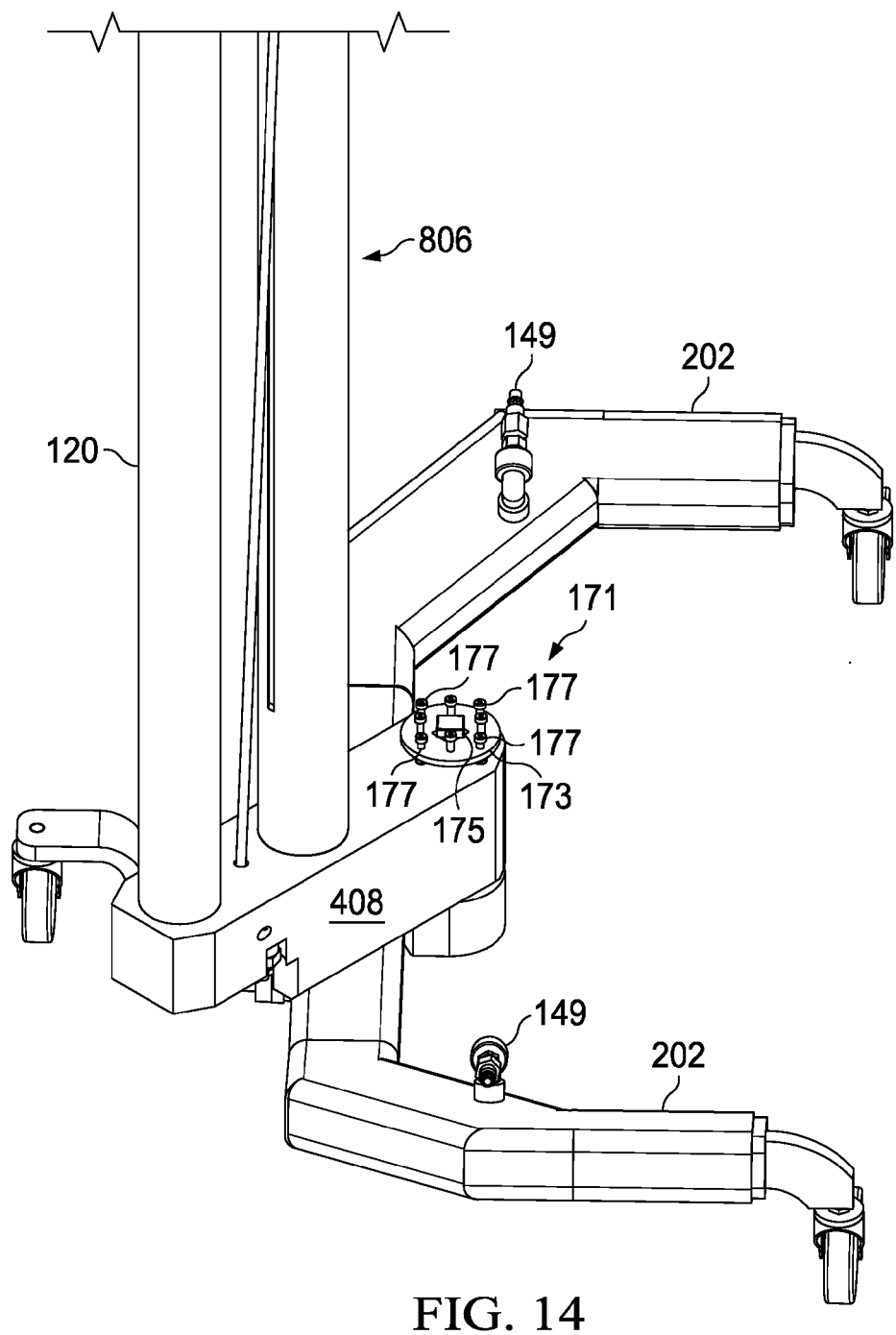
Figure 15:
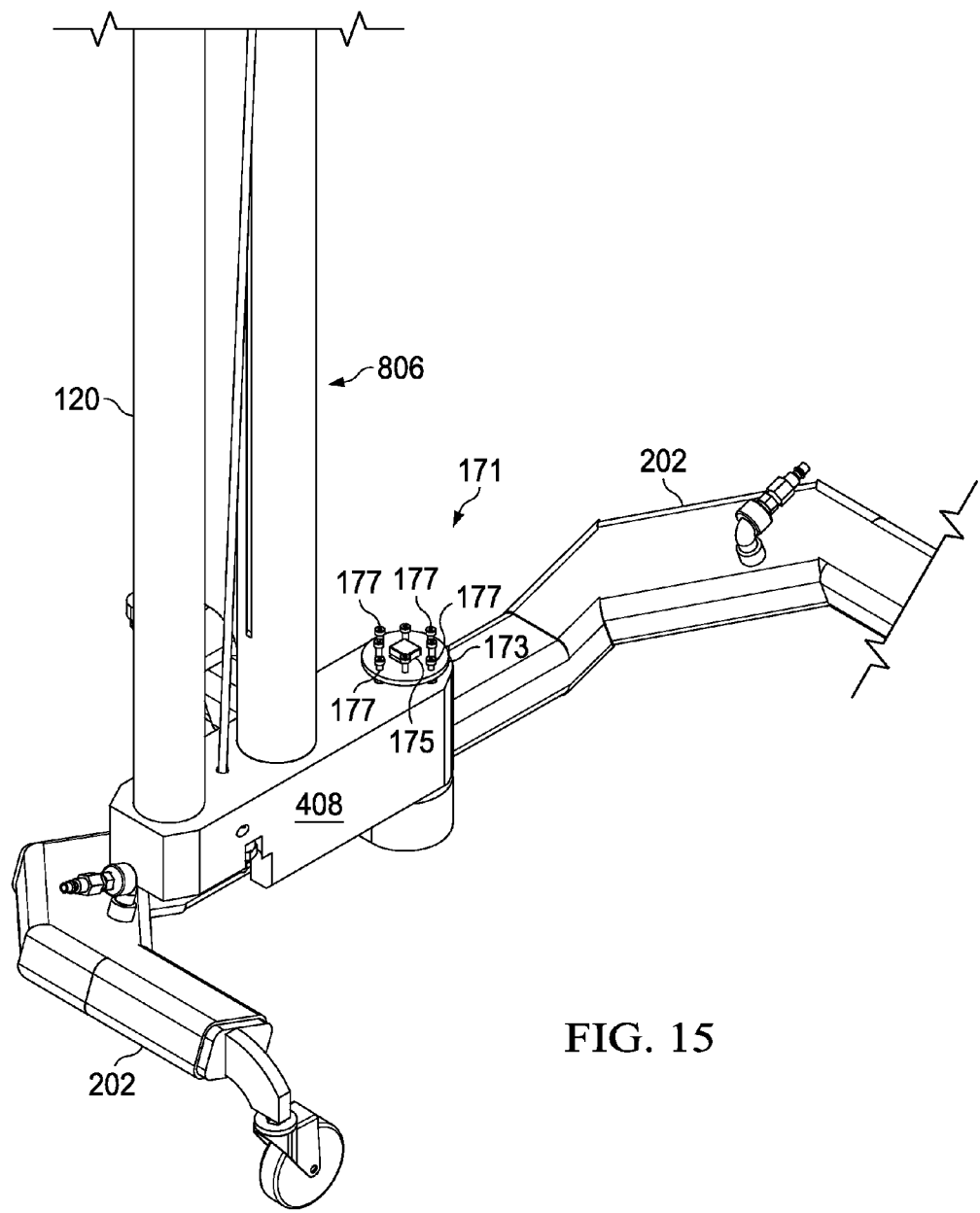

With reference to FIGS. 10-12, the leg structure 202 and control housing column 120 were designed to also serve as on-board pressurized air storage vessels or cavities so the dolly 100 could function for a time even after being disconnected from the shop air source. This can be very useful in locations where shop air is less convenient, for example, at a wheel balancing machine, or at a tire changing table, or anywhere away from a compressed air source. Pressurized shop air is preferably supplied through one of two inlet plugs 149 in the leg structure 202 or one inlet plug 121 in the control housing column 120, and stored in an air storage cavity 145 defined within the leg structure 202 and control housing column 120, as described above in section 6. entitled "'Both hands on wheel' for raising or lowering of wheel." This pressurized air is preferably taken from the cavity 145 of the control housing column 120 to supply the lifting pressure to the air cylinder 406. Compressed air within the cavity 145 of the "rotatable" leg structure 202 is preferably channeled to the air storage cavity 145 in the control housing column 120.

The leg structure 202 is preferably made of rectangular aluminum tubing for defining the open cavity 145 for air storage inside of it. Since the leg structure 202 preferably rotates relative to the base block 408, the compressed air must be channeled through this rotating connection. To accomplish this, o-ring seals 151 are preferably placed between the rotating pivot shaft 404 and the base block 408. The o-rings 151 are preferably located just below the upper bearing 153 and just above the lower bearing 155 in the base block 408. A vertical hole 157 in the shaft intersects two horizontal holes 159 in the shaft that go to the shaft perimeter surface. The lower horizontal hole aligns with an air channel 163 machined in the rotation housing of the leg structure. Another hole 165 connects this channel with the space inside the leg structure. The upper horizontal hole in the shaft aligns with an air channel 167 machined in the base block. Another intersecting channel machined into the base block takes the compressed air to the side face of the base block. Another intersecting channel is machined in the side face of the base block to provide a path to the other end of the base block near the control housing column. A plate with o-ring seal covers this channel on the side of the base block. Another intersecting hole in the base block connects the channel along the side with a circular channel 169 around the large tapered hole that supports the control housing column. Aligned with the circular channel are holes in the control housing column that allow air to pass into the column. Air is taken from the control housing column to lift the wheels, as depicted in FIG. 11.

9. Foot Lock Mechanism

With reference to FIGS. 12-15, a foot lock mechanism 171 allows locking the relative position of the leg structure 202 to the base block 408 (including the air actuator 806, control housing column 120 and wheel carriage 402) at various positions (e.g., 180 degrees apart). This unique design preferably incorporates a locking disc 173 with a rectangular hole 175 in the middle of it. The locking disc 173 is preferably rotationally fixed relative to the base block 408 with four shoulder bolts 177 that screw into the base block and pass through clearance holes in the locking disc. The shoulder bolts 177 allow the locking disc 173 to move upward or downward a short distance relative to the base block 408. Springs 179 (FIG. 12) are placed over the shoulder bolts in the space between the locking disc and the base block. The leg structure 202 rotates about a shaft 404 passing through the base block and then through the locking disc. The shaft 404 has a rectangular cross section 181 just slightly smaller than the rectangular hole in the locking disc. Without any external force, the springs 179 under the locking disc push the locking disc upward as it can slide a short distance on the four shoulder bolts 177. The locking disc 173 stops when it contacts the heads of the shoulder bolts 177. At this position, the rectangular hole 175 in the locking disc 173 engages the rectangular cross section 181 of the shaft 404 that rigidly connects to the leg structure 202. The leg structure 202 cannot rotate because the locking disc prevents rotation due to the shoulder bolts fixed into the base block. To unlock this mechanism, and thereby rotate the leg structure 202, the operator must apply a downward pressure to the locking disc 173, preferably using his foot. This downward pressure compresses the springs under the locking disc and allows the locking disc to lower a small distance. The cross section of the shaft 404 changes from rectangular 181 to circular 183 over this small distance and thereby allows relative rotation between the shaft and locking disc. After only a small amount of rotation, the operator no longer needs to apply a force and can remove his foot from the locking disc. When he removes the force (from his foot), the springs will push the locking disc upward but it will not move upward because the rectangular hole and the rectangular shaft cross section are not similarly clocked. Once the clocking aligns, (e.g., at 180 degrees, or other angle) the locking disc 173 will pop up around the shaft 404 and lock it in its new position. While this design incorporates a rectangular shape that enables locking at 180 degree increments, a square shape could be used to provide locking at 90 degree increments. Similarly, a six-sided shape could be used to provide locking at 60 degree increments.

10. Air Supply Quick Disconnect Fitting

Figure 16:
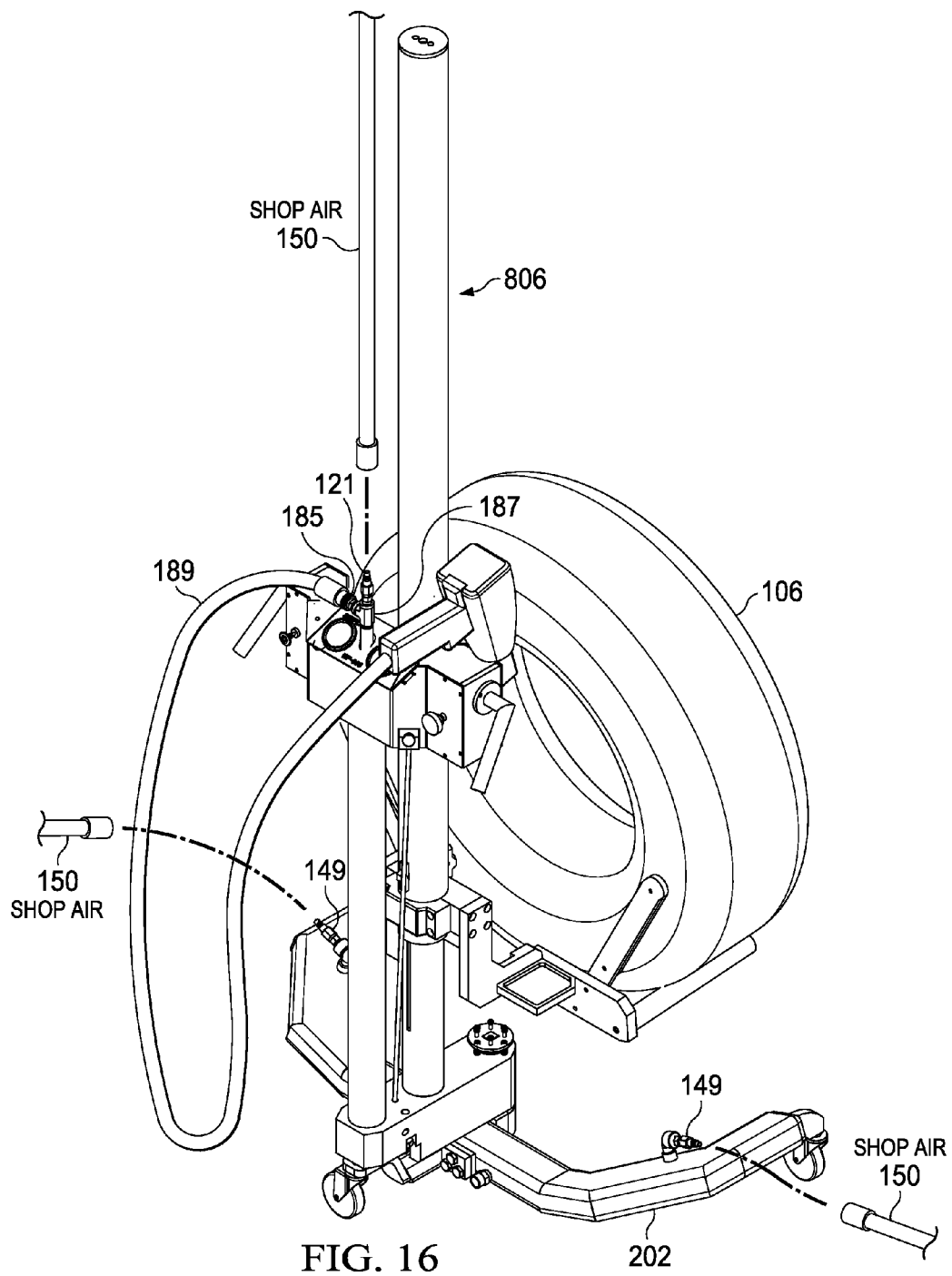
FIG. 16 depicts air supply quick disconnect fittings for providing shop air outlet from the dolly of FIG. 1.

With reference to FIG. 16, air supply quick disconnect (QD) fittings provide an on-board shop air outlet to power air tools, such as impact wrenches. Many automotive repair tasks require tools that operate on compressed air. Since this design uses a compressed air source 150, it is beneficial to provide an auxiliary compressed air source when the dolly 100 is using the available air source (nearest hose) 150. So the dolly 100 preferably incorporates a "T" fitting 187 with a QD fitting 185 coming off one of the "T" legs, through which QD fitting 185 auxiliary compressed air is supplied. The design also preferably includes a short length (e.g., 6 ft) of hose 189 with male QD plug fitting on one end and female QD fitting on the other end. The operator can then plug the air supply hose 189 onto QD fitting 185 to thereby provide auxiliary air supply to power his tools.

11. Three Air Inlet Locations.

Figure 17:
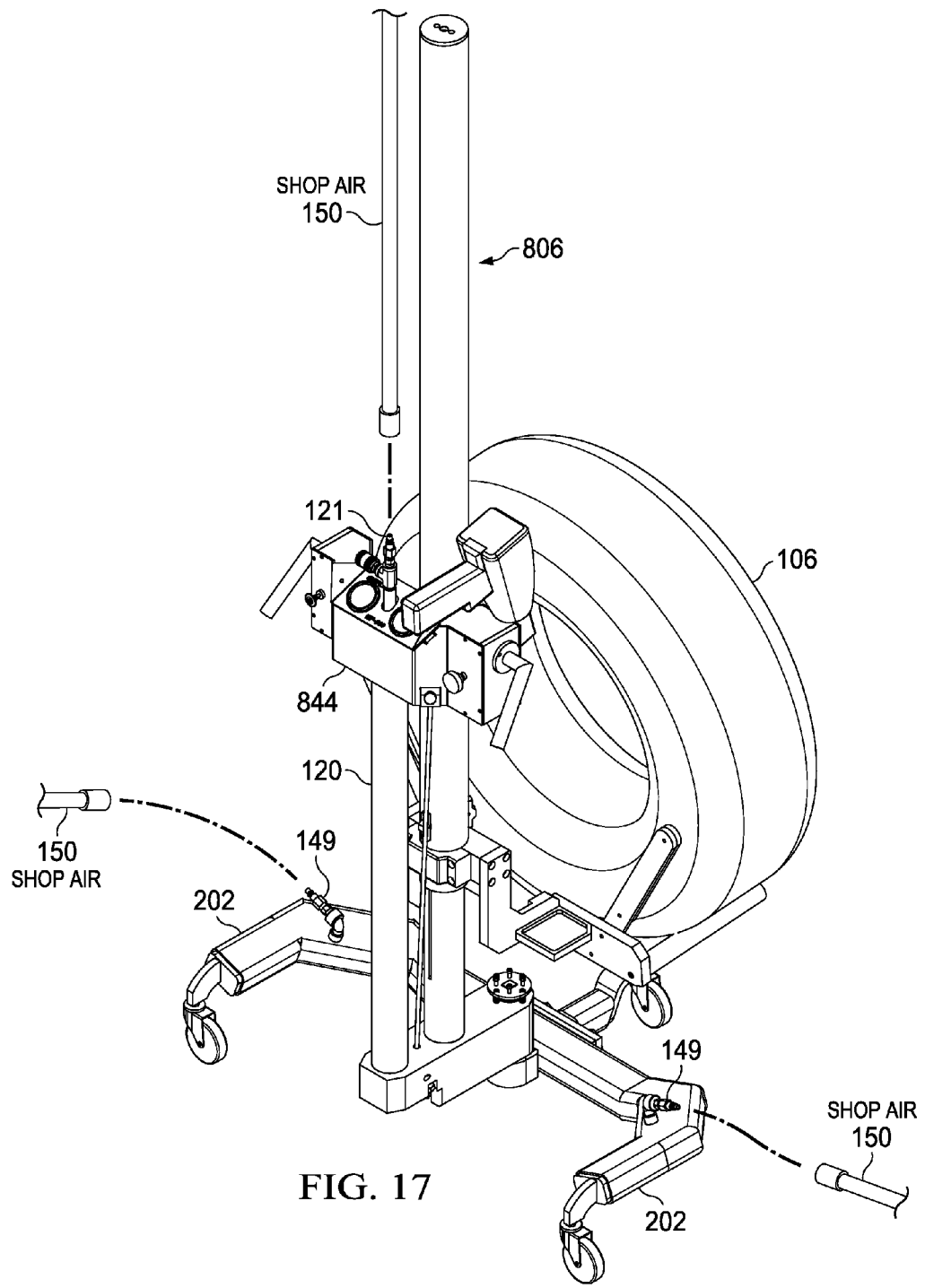
FIG. 17 depicts three air inlet locations of the dolly of FIG. 1.

With reference to FIG. 17, the dolly 100 incorporates three air inlet locations. This is useful because, with so many shop configurations, the air source hose can come from almost any direction. Accordingly, the dolly has one input plug 149 on each leg 202 (left side and right side) and another input plug 121 on top of the control housing 844 to connect to overhead air supply sources (hoses) 150.

12. Car Door Support Attachments for Installation of Car Doors

Figure 18:
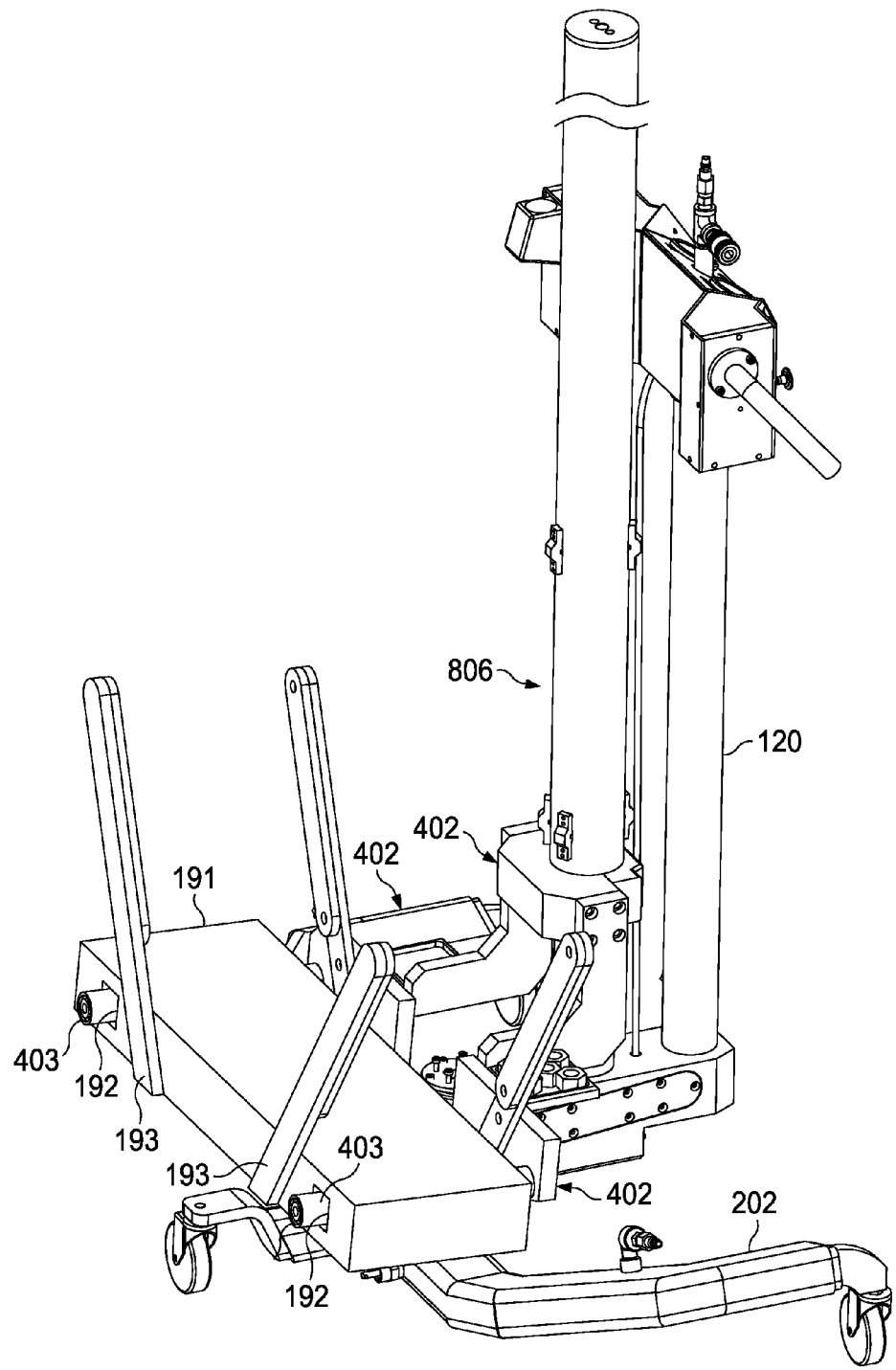
FIG. 18 depicts car door support attachments of the dolly of FIG. 1.

With reference to FIG. 18, the wheel carriage 402 preferably has an attachment 191 configured to support a car door (not shown) to facilitate the attachment or removal of doors from cars. The attachment 191 defines openings 192 that receive and engage the rollers 403 of the wheel carriage 402, thereby securing the attachment 191 to the dolly. The attachment 191 preferably includes arms 193 for restraining a car door supported on the attachment 191. The slow lift or slow lower capability (discussed in section 5, above) is very useful for this purpose.

13. Platform/Tray for Lifting Items

Figure 19:
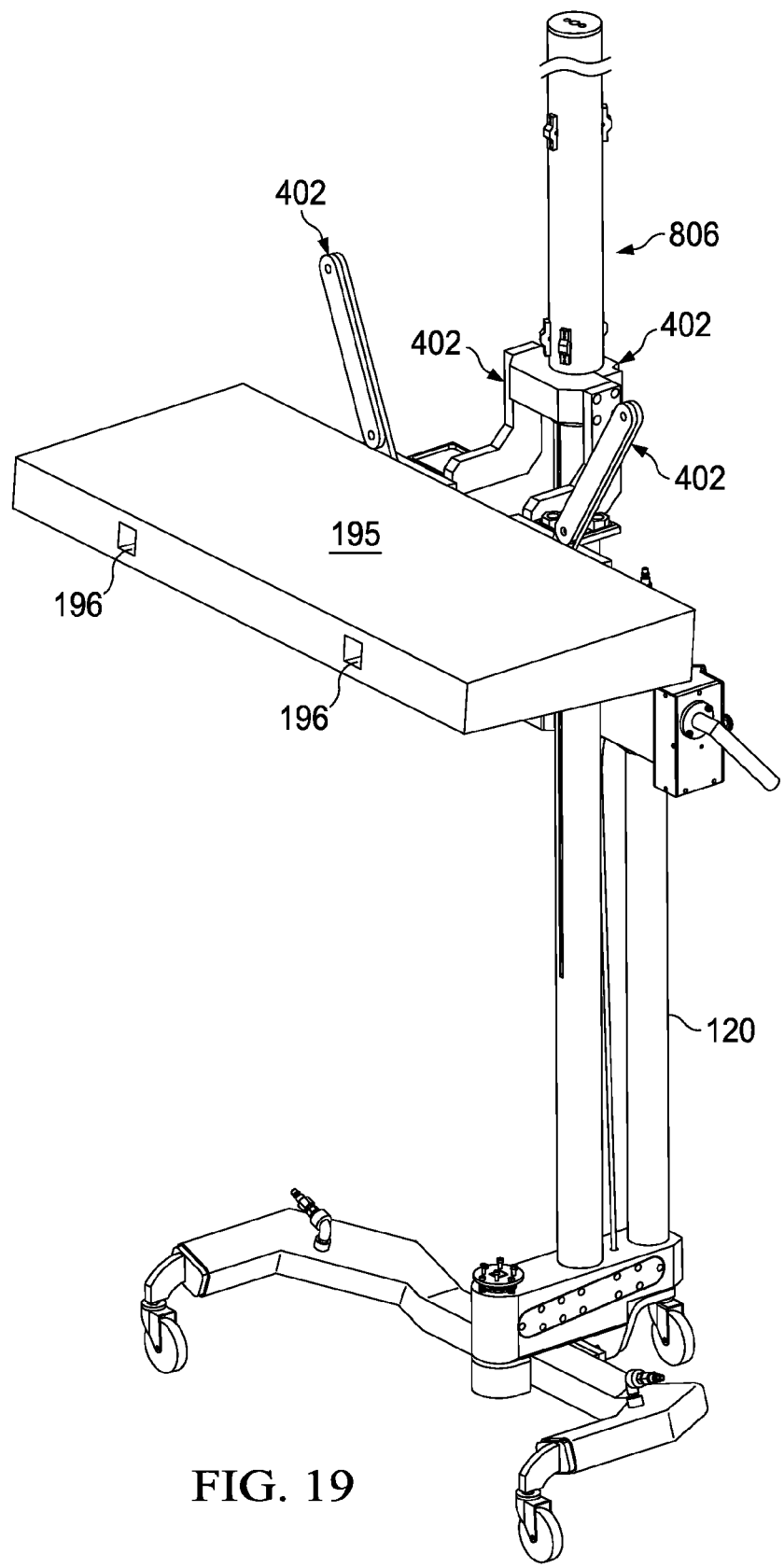
FIG. 19 depicts a platform/tray attached to the dolly of FIG. 1 for lifting heavy items.

With reference to FIG. 19, this design incorporates a tray 195 for lifting or lowering items placed thereon. The tray 195 defines openings 196 that receive and engage the rollers 403 of the wheel carriage 402, thereby securing the tray to the dolly.

14. Platform/Tray/Work Surface Attachment

Figure 20:
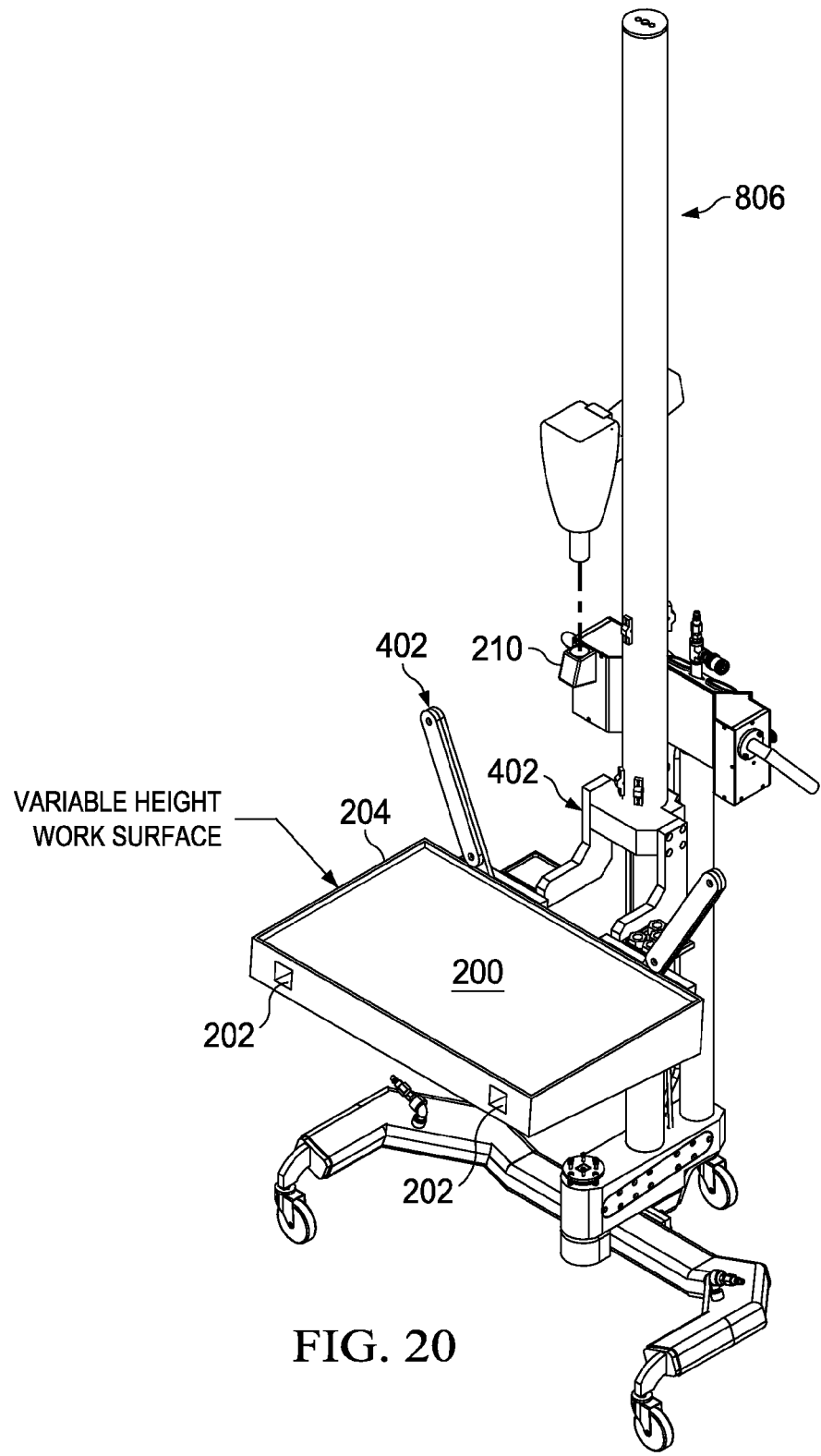
FIG. 20 depicts an impact wrench support attached to the dolly of FIG. 1 and a variable height work surface.

With reference to FIG. 20, a platform/tray/work surface 200 is provided for use as a mobile, variable height, work surface. The tray 200 defines openings 202 that receive and engage the rollers 403 of the wheel carriage 402, thereby securing the tray 200 to the dolly. The tray 200 preferably includes a lip 204 extending around the periphery of the tray for containing small items, such as nuts and screws, that may otherwise roll off of the surface. Many jobs in the shop require working at various heights. This design incorporates an add-on adjustable-height work surface 200 that is very beneficial in supporting these needs. In an alternative embodiment, the tray 200 may be turned over to provide a surface without the lip 204, thereby providing tray functionality similar to that found in the tray 195 of FIG. 19.

15. Impact Wrench Holder

With reference to FIG. 20, a holder 210 for holding air tools, such as an impact wrench, is located on the back of the control housing 844 to provide a convenient place for operators to rest an air tool, such as an impact wrench, instead of laying it on the floor.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A wheel lift system comprising:
  a support structure configured having three legs, and a wheel mounted at the end of each leg;
  a base block mounted on the support structure;
  a gas actuator mounted on the base block, the gas actuator comprising:
    a gas cylinder;
    a plug sealing a lower end of the gas cylinder;
    a cylindrical actuating rod slidably mounted within the gas cylinder;
    a carriage support tube slidably mounted on an exterior surface of the actuating rod, wherein the wheel carriage is mounted on the carriage support tube;
    a cap fixedly coupling an upper end of the carriage support tube to an upper end of the cylindrical actuating rod;
    an internal piston fixedly coupled to a lower end of the actuating rod;

a damper piston fixedly positioned within the actuating rod and defining a damping orifice;

a liquid fluid contained within an interior portion of the actuating rod above the internal piston, the fluid being sufficient to pass through the damping orifice and level off above the damper piston when the actuating rod and the internal piston are in a lowermost position;

a gaseous fluid contained within a gas cylinder cavity of the gas cylinder between the internal piston and the plug, the gas cylinder cavity being configured for fluid communication with a source of pressurized gas which, when injected into or released from the gas cylinder cavity, causes the cylindrical actuating rod and carriage support tube to move up or down, respectively;

a damper tube extending through the gaseous fluid, the plug, the liquid fluid, and the internal piston, the damper tube including a lower end being fixedly secured to a lower end of the plug and an upper end fixedly secured to the damper piston to fix the position of the damper piston relative to the gas cylinder;

a wheel carriage mounted on the carriage support tube so that the wheel carriage moves up and down with the carriage support tube.

2. The wheel lift system of claim 1, wherein two of the legs of the support structure extend at an upward angle at the ends thereof for allowing access to accommodate automotive low-rise lifts.

3. The wheel lift system of claim 1, wherein two of the legs of the support structure extend at an upward angle at the ends thereof and form a "C" shape and a third leg extends away from a mid-portion of the "C" shape and substantially directly under the wheel carriage.

4. The wheel lift system of claim 1, wherein:
two of the legs of the support structure extend at an upward angle at the ends thereof and form a "C" shape and a third leg extends away from a mid-portion of the "C" shape; and
the base block is rotatably mounted on the support structure to allow the wheel carriage to rotate about a vertical axis with respect to the support structure.

5. The wheel lift system of claim 1, further comprising a pressure regulator coupled in fluid communication between the gas cylinder cavity and a source of pressurized gas for maintaining a constant pressure of gas to the gas cylinder cavity.

6. The wheel lift system of claim 1, further comprising a pressure regulator coupled in fluid communication between the gas cylinder cavity and a source of pressurized gas for maintaining a constant pressure of gas to the gas cylinder cavity, so that if the wheel carriage is moved upwardly, gas pressure is increased, and if the wheel carriage is moved downwardly, gas pressure is released.

7. The wheel lift system of claim 1, further comprising an emergency relief valve coupled in fluid communication between the gas cylinder cavity and at least one of a source of pressurized gas from a pressure regulator and a tube directing exhaust gas to atmosphere.

8. The wheel lift system of claim 1, wherein the liquid fluid is oil.

9. The wheel lift system of claim 1, wherein the gaseous fluid is air.

10. The wheel lift system of claim 1, further comprising ball bearing rollers positioned between the gas cylinder and the carriage support.

11. The wheel lift system of claim 1, wherein the support structure defines cavities for storing pressurized gas for regulated use in the gas cylinder cavity.

12. The wheel lift system of claim 1, further comprising:
a control housing mounted on the wheel lift system; and
a control housing column mounted on the base block for supporting the control housing, wherein the control housing column defines a control housing cavity for storing pressurized gas for regulated use in the gas cylinder cavity.

13. The wheel lift system of claim 1, further comprising a pivot shaft secured to the support structure, the pivot shaft defining a tip having a lower portion defining a circular cross-section and an upper portion defining a rectangular cross-section, wherein the base block is rotatably mounted to the support structure via the pivot shaft, the wheel lift system further comprising a foot lock mechanism comprising:
a locking disc defining a rectangular hole for receiving the rectangular tip of the pivot shaft;
at least two shoulder bolts secured to and extending from the base block, the at least two shoulder bolts securing the locking disc to the base block; and
at least two springs, one of the at least two springs fitting over each of the at least two shoulder bolts urging the locking disc upwardly preventing rotation of the base block relative to the support structure, the at least two springs when compressed allowing the locking disc to receive the circular cross-section of the pivot shaft allowing rotation of the base block relative to the support structure.

14. The wheel lift system of claim 1 further comprising at least one quick disconnect fitting mounted to the system, the quick disconnect fitting being in fluid communication with a source of pressurized gas to power gas tools.

15. The wheel lift system of claim 1 further comprising at least one gas inlet on the at least one leg of the three legs of the support structure.

16. The wheel lift system of claim 1, further comprising:
a control housing mounted on the wheel lift system;
a control housing column mounted on the base block for supporting the control housing, wherein the control housing column defines a control housing cavity for storing pressurized gas for regulated use in the gas cylinder cavity; and
at least one gas inlet mounted on the control housing and in fluid communication with the control housing cavity.

17. The wheel lift system of claim 1 wherein the wheel carriage is configured to support a car door.

18. The wheel lift system of claim 1 wherein the wheel carriage is configured as a tray for lifting items.

19. The wheel lift system of claim 1 wherein the wheel carriage is configured as a work surface.

20. The wheel lift system of claim 1, further comprising:
a control housing mounted on the wheel lift system; and
a holder mounted to the control housing for holding gas tools.

21. The wheel lift system of claim 1, wherein the gas actuator further comprises:
a control mechanism; and
a needle rod coupled to and slidably extending from a lower end coupled to the control mechanism through the damper tube to an upper end proximate to the damping orifice of the damper piston, the control mechanism being configured for moving the needle rod upwardly to close the damping orifice and lock the actuating rod in place or downwardly to open the damping orifice and allow movement of the actuating rod.

22. A wheel lift system comprising:
- a support structure;
- a base block mounted on the support structure;
- a gas actuator mounted on the base block;
- a wheel carriage mounted on the gas actuator, the gas actuator being configured for facilitating vertical lift of the wheel carriage; and
- a pressure regulator in fluid communication with the gas actuator for connection to a source of pressurized gas, the pressure regulator being arranged to maintain a constant pressure of gas in the gas actuator, such that if the wheel carriage is moved upwardly by an operator, gas is added to the gas actuator, and if the wheel carriage is moved downwardly by an operator, gas is released from the gas actuator.

23. The wheel lift system of claim 22 wherein the support structure includes three legs, and a wheel mounted at the end of each leg.

24. The wheel lift system of claim 22, wherein:
- the support structure includes three legs, and a wheel mounted at the end of each leg, and
- two of the legs of the support structure extend at an upward angle at the ends thereof and form a "C" shape and a third leg extends away from a mid-portion of the "C" shape and substantially directly under the wheel carriage.

25. The wheel lift system of claim 22, wherein:
- the support structure includes three legs, and a wheel mounted at the end of each leg,
- two of the legs of the support structure extend at an upward angle at the ends thereof and form a "C" shape and a third leg extends away from a mid-portion of the "C" shape; and
- the base block is rotatably mounted on the support structure to allow the wheel carriage to rotate about a vertical axis with respect to the support structure.

26. The wheel lift system of claim 22, further comprising:
- a control housing mounted on the wheel lift system;
- a control housing column mounted on the base block for supporting the control housing, wherein the control housing column defines a control housing cavity for storing pressurized gas for regulated use in the gas cylinder cavity; and
- at least one gas inlet mounted on the control housing and in fluid communication with the control housing cavity.

27. The wheel lift system of claim 22 wherein the wheel carriage is configured to support a car door; wherein the wheel carriage is configured as a tray for lifting items; or wherein the wheel carriage is configured as a work surface.

28. A wheel lift system comprising:
- a support structure having three legs, and a wheel mounted at the end of each leg, wherein two of the legs of the support structure extend at an upward angle at the ends thereof and form a "C" shape and a third leg extends away from a mid-portion of the "C" shape; and
- a wheel carriage mounted on the support structure, the support structure being configured providing vertical lift and support of the wheel carriage positioned substantially directly over the third leg.

29. The wheel lift system of claim 28 further comprising a base block rotatably mounted on the support structure, and wherein the wheel carriage is mounted on the base block for enabling the wheel carriage to rotate about a vertical axis with respect to the support structure.

30. A wheel lift system comprising:
- a hollow support structure configured for storing pressurized air;
- a base block mounted on the support structure;
- a gas actuator mounted on the base block; and
- a wheel carriage mounted on the gas actuator, the gas actuator being configured for using the pressurized air to facilitate vertical lift of the wheel carriage.

31. The wheel lift system of claim 21 wherein the needle rod is configured for controlling the size of the opening in the damping orifice, the size of the opening in the damping orifice corresponding to the degree of damping effected on vertical movement of the actuating rod.

32. The wheel lift system of claim 21, wherein the control mechanism is a plate pivotally attached to the base block.

33. The wheel lift system of claim 21, wherein the control mechanism comprises:
- a plate pivotally attached to the base block;
- a spring mounted between the base block and the plate for biasing the plate downwardly; and
- an actuating cable configured for pulling the plate upwardly.

* * * * *